US 12,527,886 B2

(12) United States Patent
Lee et al.

(10) Patent No.: US 12,527,886 B2
(45) Date of Patent: Jan. 20, 2026

(54) RADIOPHARMACEUTICALS AND COMPOSITION FOR THROMBUS IMAGING

(71) Applicants: THE ASAN FOUNDATION, Seoul (KR); UNIVERSITY OF ULSAN FOUNDATION FOR INDUSTRY COOPERATION, Ulsan (KR)

(72) Inventors: Sang Ju Lee, Seoul (KR); Seung Jun Oh, Seoul (KR); Jae-Seung Kim, Seoul (KR); Dae Hyuk Moon, Seoul (KR); Sun Young Chae, Seoul (KR)

(73) Assignees: THE ASAN FOUNDATION, Seoul (KR); UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 565 days.

(21) Appl. No.: 17/995,054

(22) PCT Filed: Mar. 24, 2021

(86) PCT No.: PCT/KR2021/003629
§ 371 (c)(1),
(2) Date: Sep. 29, 2022

(87) PCT Pub. No.: WO2021/201488
PCT Pub. Date: Oct. 7, 2021

(65) Prior Publication Data
US 2023/0142546 A1    May 11, 2023

(30) Foreign Application Priority Data
Mar. 31, 2020 (KR) .................. 10-2020-0039471

(51) Int. Cl.
| *A61K 51/00* | (2006.01) |
| *A61K 49/04* | (2006.01) |
| *A61K 49/06* | (2006.01) |
| *A61K 51/04* | (2006.01) |
| *A61P 7/02*  | (2006.01) |

(52) U.S. Cl.
CPC ............ *A61K 51/0497* (2013.01); *A61P 7/02* (2018.01)

(58) Field of Classification Search
CPC .................. A61K 51/088; A61K 49/14; A61K 49/0002; A61K 49/0056; A61K 49/085; A61K 2121/00; A61K 47/547; A61P 7/02
See application file for complete search history.

(56) References Cited

U.S. PATENT DOCUMENTS

| 2016/0008490 A1* | 1/2016 | Berger | .............. C07F 5/003 540/465 |
| 2018/0078579 A1* | 3/2018 | Haase  | .............. A61K 31/519 |
| 2018/0169274 A1* | 6/2018 | Berger | .............. C07D 257/02 |

FOREIGN PATENT DOCUMENTS

| CN | 105189521 A      | 12/2015 |
| KR | 10-2014-0085426 A | 7/2014  |

OTHER PUBLICATIONS

Giblin et al. Radiometallation of Receptor-Specific Peptides for Diagnosis and Treatment of Human Cancer. 2005. In vivo. vol. 19. pp. 9-30. (Year: 2005).*
Radiology Key. Novel 68Ga-Labeled Pteroic Acid-Based PET Tracer for Tumor Imaging via the Folate Receptor. Sep. 1, 2016. <https://radiologykey.com/novel-68ga-labeled-pteroic-acid-based-pet-tracer-for-tumor-imaging-via-the-folate-receptor/>. (Year: 2016).*
Cutler, Cathy S. et al., "Radiometals for Combined Imaging and Therapy," Chemical Reviews, 2013, vol. 113, No. 2, pp. 858-883.
Cong, Xin et al., "Research Progress of the Production of Chelating Agents," Shandong Chemical Industry, 2012, vol. 41, No. 7, pp. 38-43 (with English Abstract).
International Search Report mailed on Jul. 12, 2021 in PCT/KR2021/003629 filed on Mar. 24, 2021 (4 pages).
Lee, N. et al. "Radiation dosimetry of [$^{18}$F]GP1 for imaging activated glycoprotein IIb/IIIa receptors with positron emission tomography in patients with acute thromboembolism", Nuclear Medicine and Biology, 2019, pp. 45-48 (5 total pages).
Lohrke, J et al., "$^{18}$F-GP1, a Novel PET Tracer Designed for High-Sensitivity, Low-Background Detection of Thrombi", The Journal of Nuclear Medicine, Jul. 2017, vol. 58, No. 7, pp. 1094-1099 (7 total pages).
Velikyan, I., "Prospective of $^{68}$Ga-Radiopharmaceutical Development", Theranostics, 2014, vol. 4, No. 1, pp. 47-80 (35 total pages).
Hoekstra, W.J. et al., "Potent, Orally Active GPIIb/IIIa Antagonists Containing a Nipecotic Acid Subunit. Structure-Activity Studies Leading to the Discovery of RWJ-53308", Journal of Medicinal Chemistry, 1999, vol. 42, No. 25, pp. 5254-5265 (13 total pages).

* cited by examiner

*Primary Examiner* — Tracy Liu
(74) *Attorney, Agent, or Firm* — Oblon, McClelland, Maier & Neustadt, L.L.P.

(57) ABSTRACT

A compound represented by the following Formula 1 or a pharmaceutically acceptable salt thereof:

Formula 1 where $R_1$ is a chelating agent labeled with a metallic radioisotope. A thrombus imaging composition including the compound or the pharmaceutically acceptable salt thereof labeled with a metallic radioisotope as an active ingredient.

20 Claims, 20 Drawing Sheets

RADIOPHARMACEUTICALS AND COMPOSITION FOR THROMBUS IMAGING

CROSS REFERENCE TO RELATED APPLICATIONS

This application is a National Stage entry under 35 U.S.C. § 371 of PCT/KR2021/003629, filed on Mar. 24, 2021, and claims priority to Korean Patent Application No. 10-2020-0039471, filed on Mar. 31, 2020. The entire contents of both are incorporated herein by reference.

TECHNICAL FIELD

The present invention is a composition for stabilizing a radiopharmaceutical, which includes a vitamin B compound as an active component, and a radiopharmaceutical composition including the same.

BACKGROUND ART

Novel highly specific non-peptide glycoprotein IIb/IIIa antagonists are described in the related art (Document [Damiano et al., Thrombosis Research 2001 104, 113-126; Hoekstra, W. J., et al., J. Med. Chem., 1999, 42, 5254-5265]). These compounds are known to be effective GPIIb/IIIa antagonists as therapeutic agents with antiplatelet and antithrombotic activity (see WO95/08536, WO96/29309, WO97/33869, WO9701/60813, and U.S. Pat. No. 6,515,130). Further, the potential use of glycoprotein IIb/IIIa antagonists as contrast agents has also been proposed. However, the use of thrombus imaging using glycoprotein antagonists is unknown.

In addition, current methods of preparing a compound including an imaging moiety include [$^{18}$F]-fluorochemical techniques, and many methods have focused on nucleophilic [$^{18}$F]-fluorochemical techniques using potassium fluoride (KF). These methods produce an elemental fluoride supply source via anion exchange between, for example, potassium carbonate ($K_2CO_3$) and the [18F]-containing species produced in a cyclotron, and often need to enhance reactivity by adding 4,7,13,16,21,24-hexaoxa-1,10-diazabicyclo[8.8.8]-hexacosanoic acid (Kryptofix 222) which is often an aza-crown ether. Although these methods are suitable for producing clinical amounts, the efficiency, tricky purification and complicated processes are not suitable for extensive commercial application.

Meanwhile, through an F-18 radiolabeled compound with high affinity and specific binding to glycoprotein IIb/IIIa, non-invasive imaging using a PET imaging technique could be achieved. However, as mentioned above, the F-18 radioactive labeling method is complicated, needs separate equipment, and has a problem in that the method cannot be applied to emergency patients because it takes about 4 hours to administer the compound to a patient through procedures such as quality control after purification.

DISCLOSURE

Technical Problem

Thus, the present inventors have made studies and efforts to develop a radiopharmaceutical capable of simply labeling glycoprotein IIb/IIIa with a radioisotope while specifically binding to glycoprotein IIb/IIIa, and as a result, developed a radiopharmaceutical that can be immediately used by conveniently labeling glycoprotein IIb/IIIa using the coupling between a metallic radioisotope and a chelator, and shows high specific binding and low background in vivo, thereby completing the present invention.

Therefore, an object of the present invention is to provide a compound characterized by being represented by Chemical Formula 1 or a pharmaceutically acceptable salt thereof.

Another object of the present invention is to provide a thrombus imaging composition including the compound labeled with a metallic radioisotope or a pharmaceutically acceptable salt thereof as an active ingredient.

Another object of the present invention is to provide a kit for preparing a metallic radioisotope-labeled radiopharmaceutical including the compound or a pharmaceutically acceptable salt thereof as an active ingredient.

Still another object of the present invention is to provide a pharmaceutical composition for diagnosing a thrombotic disease, including the thrombus imaging composition as an active ingredient.

However, the technical problems to be achieved by the present invention are not limited to the aforementioned problems, and other problems that are not mentioned may be clearly understood by those skilled in the art from the following description.

Technical Solution

To achieve the objects of the present invention, the present invention provides a compound characterized by being represented by the following Chemical Formula 1 or a pharmaceutically acceptable salt thereof.

[Chemical Formula 1]

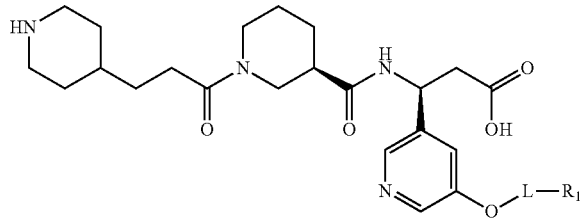

(in Chemical Formula 1,
$R_1$ is selected from the group consisting of

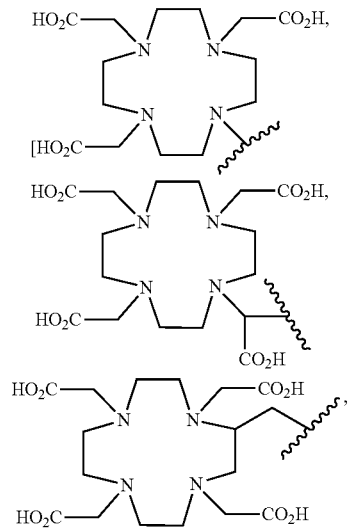

-continued

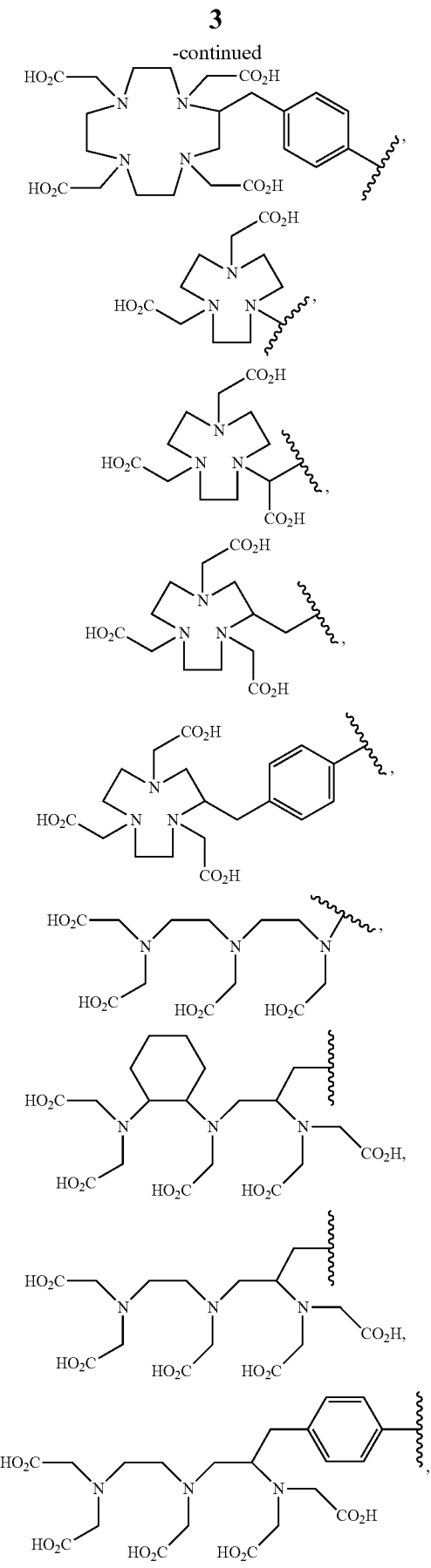

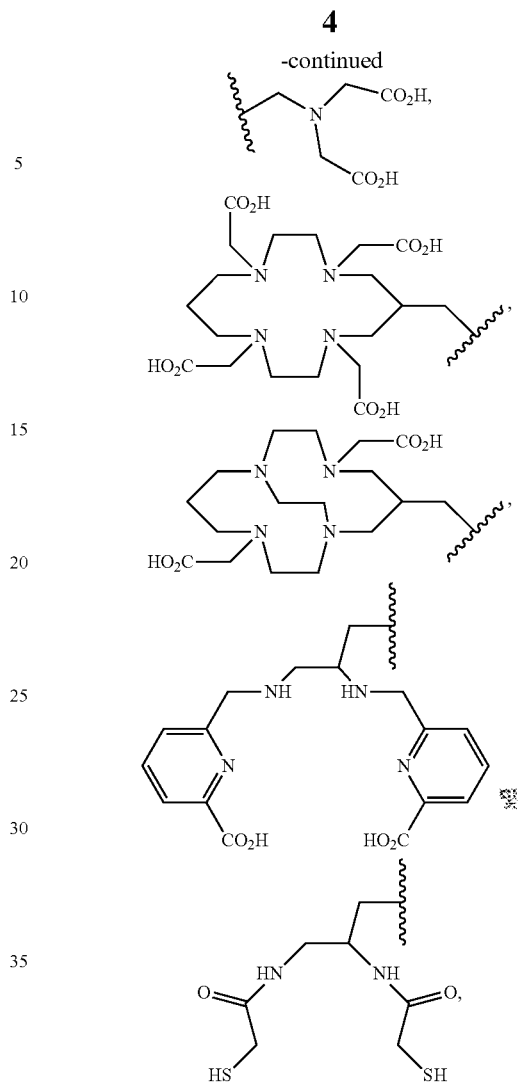

L is a direct bond, —(CH$_2$)n-NHCO—(CH$_2$)m-, or —((CH$_2$)$_2$O)x-(CH$_2$)n-NHCO—(CH$_2$)m-, and n, m and x are each independently an integer from 0 to 3.)

Furthermore, the present invention provides a thrombus imaging composition including the compound labeled with a metallic radioisotope or a pharmaceutically acceptable salt thereof as an active ingredient.

Further, the present invention provides a kit for preparing a metallic radioisotope-labeled radiopharmaceutical including the compound represented by Chemical Formula 1 or a pharmaceutically acceptable salt thereof as an active ingredient.

In addition, the present invention provides a pharmaceutical composition for diagnosing a thrombotic disease, including the thrombus imaging composition as an active ingredient.

In an exemplary embodiment of the present invention, R$_1$ may be characterized by being a chelating agent labeled with a metallic radioisotope, but is not limited thereto.

In another exemplary embodiment of the present invention, the compound represented by Chemical Formula 1 may be selected from the group consisting of the following compounds, but is not limited thereto:

2,2',2''-(10-(2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)-1,4,7,10-tetraazacyclododecane-1,4,7-triyl)triacetic acid (GP-102);

2,2'-(7-(1-carboxy-4-((2-((5-((S)-2-carboxy-1-((R)-1-(3-(piperidin-4-yl)propanoyl)piperidine-3-carboxamido)ethyl)pyridin-3-yl)oxy)ethyl)amino)-4-oxobutyl)-1,4,7-triazonane-1,4-diyl)diacetic acid (GP-103);
(S)-3-(5-(2-(2-DTPA acetamido)ethoxy)pyridin-3-yl)-3-((R)-1-(3-(piperidin-4-yl)propanoyl)piperidine-3-carboxamido)propanoic acid (GP-104); and
2,2'-((2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)azanediyl)diacetic acid (GP-105).

In still another exemplary embodiment of the present invention, the metallic radioisotope may be characterized by being selected from the group consisting of Ga-66, Ga-68, Cu-61, Cu-62, Cu-64, Cu-67, Pb-212, Bi-212, Pd-109, Y-86, Co-55, Zr-89, Sr-83, Mn-52, As-72, Sc-44, Ga-67, In-111, and Tc-99m, but is not limited thereto.

In yet another exemplary embodiment of the present invention, a compound labeled with the metallic radioisotope may be selected from the group consisting of the following Chemical Formula 2 to Chemical Formula 5, but is not limited thereto:

[Chemical Formula 2]

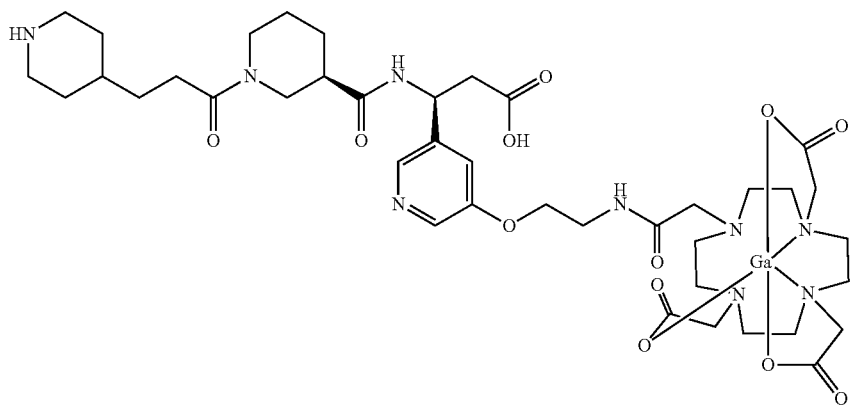

[Chemical Formula 3]

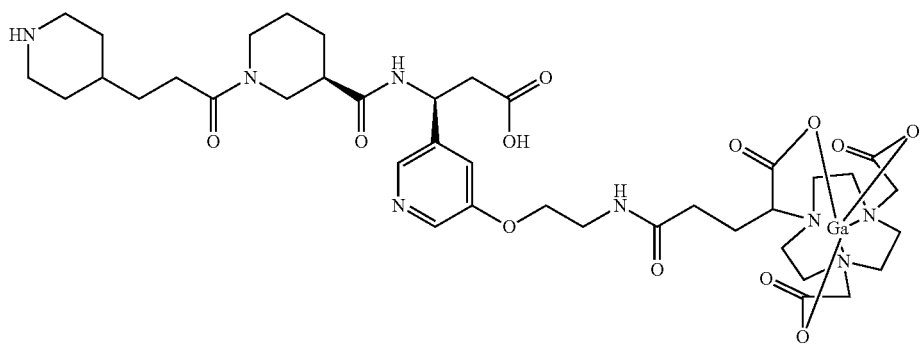

[Chemical Formula 4]

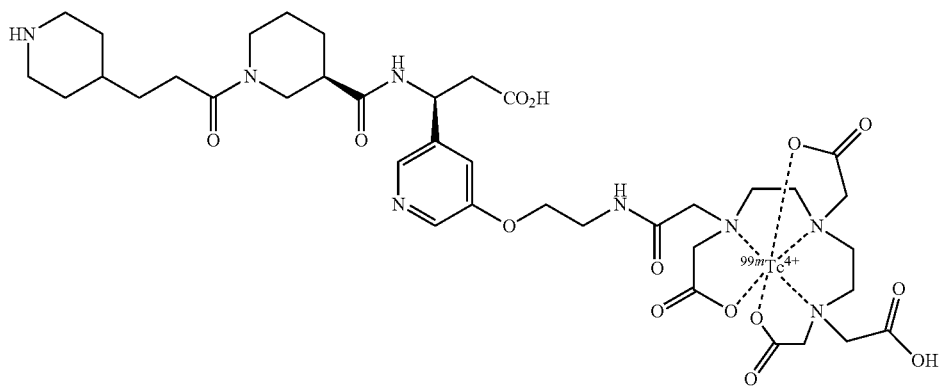

[Chemical Formula 5]

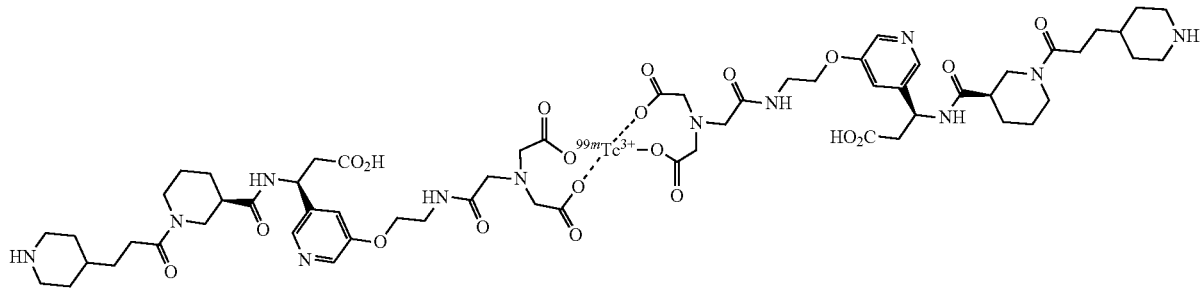

In yet another exemplary embodiment of the present invention, the kit may include one or more selected from the group consisting of cysteine, vitamin B1, and vitamin B6, but is not limited thereto.

In yet another exemplary embodiment of the present invention, the kit may further include a metallic radioisotope, but is not limited thereto.

In yet another exemplary embodiment of the present invention, the compound or a pharmaceutically acceptable salt thereof may be included in a kit in a state selected from the group consisting of a solution state, a refrigerated state, a frozen state, and a lyophilized state, but is not limited thereto.

In yet another exemplary embodiment of the present invention, the kit may include one or more selected from the group consisting of an HEPES buffer, an acetate buffer, ethanol, and water for injection, but is not limited thereto.

In yet another exemplary embodiment of the present invention, the thrombotic disease may be selected from the group consisting of thrombosis, angina pectoris, myocardial infarction, arteriosclerosis, myocardial ischemia, solid tumors and metastatic cancer, but is not limited thereto.

In addition, the present invention provides a use of the compound labeled with a metallic radioisotope or a pharmaceutically acceptable salt thereof for imaging thrombi.

Furthermore, the present invention provides a use of the compound labeled with a metallic radioisotope or a pharmaceutically acceptable salt thereof for producing or compounding a thrombus imaging agent.

Further, the present invention provides a thrombus imaging method, the method including administering an effective amount of the compound labeled with a metallic radioisotope or a pharmaceutically acceptable salt thereof to a subject in need.

In addition, the present invention provides a use of the thrombus imaging composition for diagnosing a thrombotic disease.

Furthermore, the present invention provides a use of the thrombus imaging composition for producing or compounding an agent for diagnosing a thrombotic disease.

Further, the present invention provides a method for providing information for diagnosing a thrombotic disease, the method including: administering the thrombus imaging composition to a subject in need.

In addition, the present invention provides a method for diagnosing a thrombotic disease, the method including: administering the thrombus imaging composition to a subject in need.

Advantageous Effects

The radiopharmaceutical of the present invention binds to glycoprotein IIb/IIIa with high affinity as a radiotracer labeled with a metallic isotope, and can image thrombi in a non-invasive imaging method through PET or SPECT imaging techniques due to its property of quick reduction of background radioactivity.

Further, the radiopharmaceutical of the present invention can be applied to emergency patients, which has been a challenge for conventional radiopharmaceuticals, through a convenient and quick labeling and non-purification method, and can be directly manufactured or used by manufacturing in most domestic and foreign hospitals that do not have F-18 radiopharmaceutical manufacturing facilities.

Therefore, the radiopharmaceutical of the present invention can be applied easily and simply to the characteristics of thrombotic diseases, which are common in emergency patients, and thus is expected to secure the convenience of examinations and improve the medical welfare of patients.

MODES OF THE INVENTION

Figure 1:
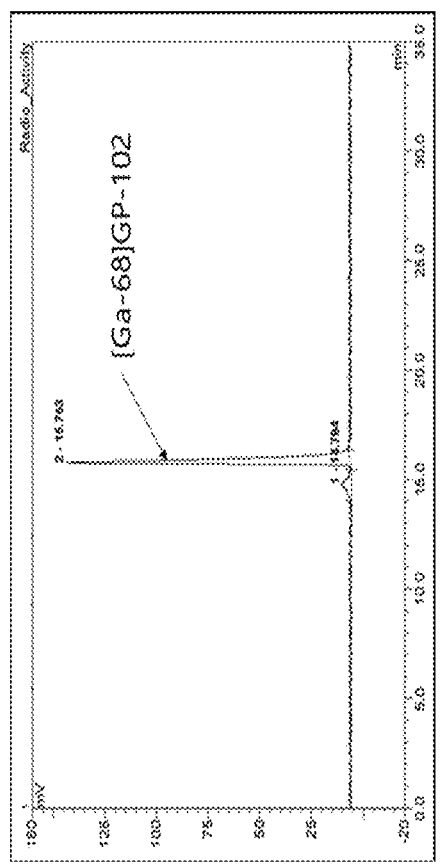
FIG. 1 illustrates the results of purifying [Ga-68]GP-102 labeled with Ga-68 using an HEPES buffer with C18 light Sep-Pak.

The present invention provides a compound characterized by being represented by the following Chemical Formula 1 or a pharmaceutically acceptable salt thereof.

[Chemical Formula 1]

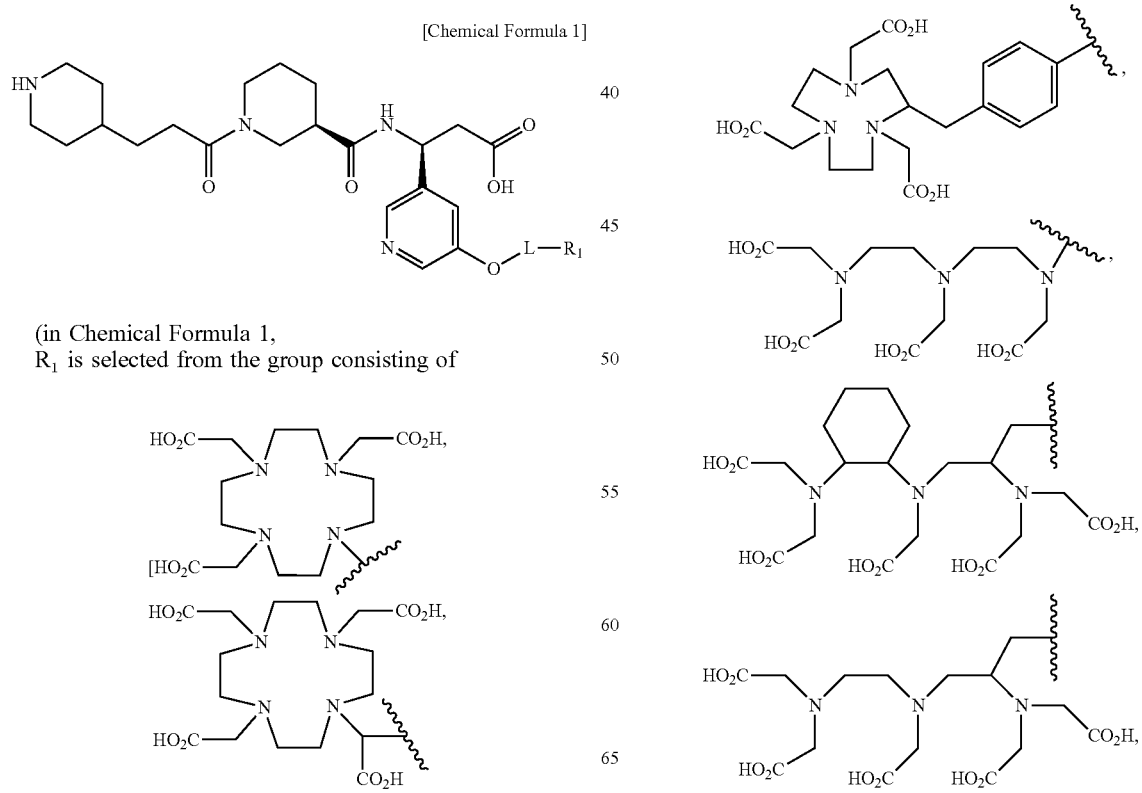

(in Chemical Formula 1,
$R_1$ is selected from the group consisting of

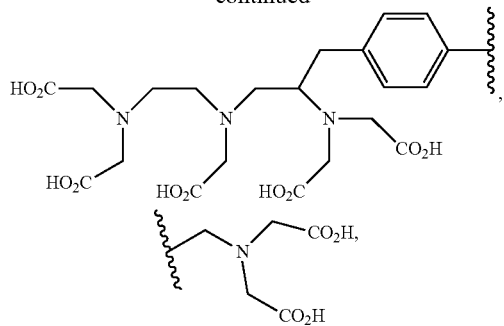

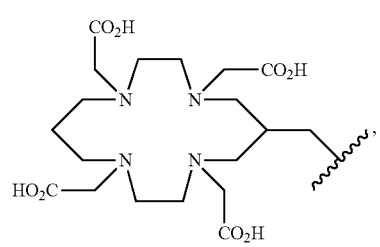

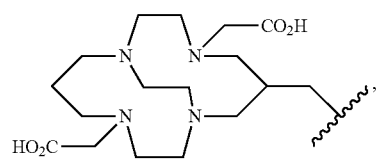

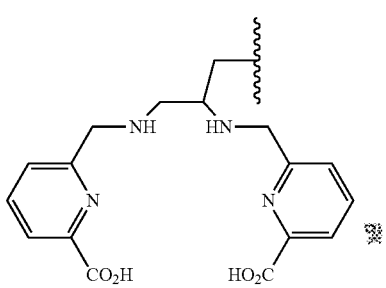

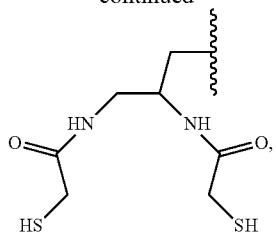

L is a direct bond, —(CH$_2$)n-NHCO—(CH$_2$)m-, or —((CH$_2$)$_2$O)x-(CH$_2$)n-NHCO—(CH$_2$)m-, and n, m and x are each independently an integer from 0 to 3.)

In the present invention, R$_1$ may be characterized by being a chelating agent labeled with a metallic radioisotope, but is not limited thereto.

In the present invention, the compound represented by Chemical Formula 1 may be selected from the group consisting of the following compounds, but is not limited thereto:

2,2',2"-(10-(2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)-1,4,7,10-tetraazacyclododecane-1,4,7-triyl)triacetic acid (GP-102);

2,2'-(7-(1-carboxy-4-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxobutyl)-1,4,7-triazonane-1,4-diyl)diacetic acid (GP-103);

(S)-3-(5-(2-(2-DTPA acetamido)ethoxy)pyridin-3-yl)-3-((R)-1-(3-(piperidin-4-yl)propanoyl)piperidine-3-carboxamido)propanoic acid (GP-104); and 2,2'-((2-((2-((5-((S)-2-carboxy-1-((R)-1-(3-(piperidin yl)propanoyl)piperidine-3-carboxamido)ethyl)pyridin-3-yl)oxy)ethyl)amino)-2-oxoethyl)azanediyl)diacetic acid (GP-105).

In the present invention, the compound represented by Chemical Formula 1 may be selected from the group consisting of the following compounds, but is not limited thereto:

GP-102

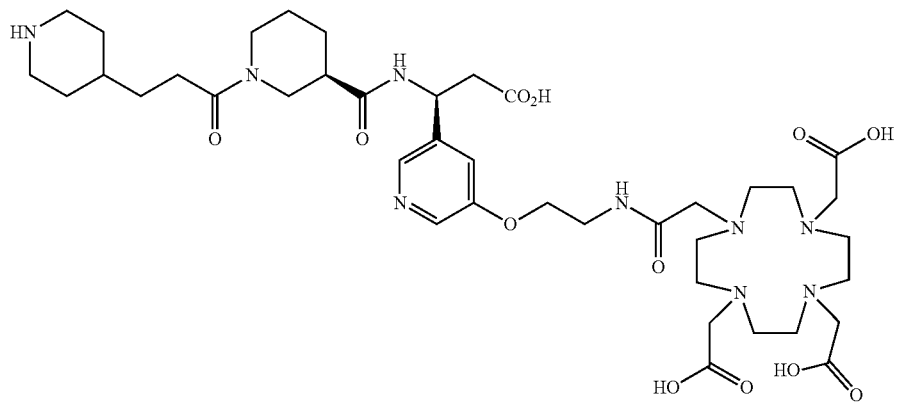

-continued

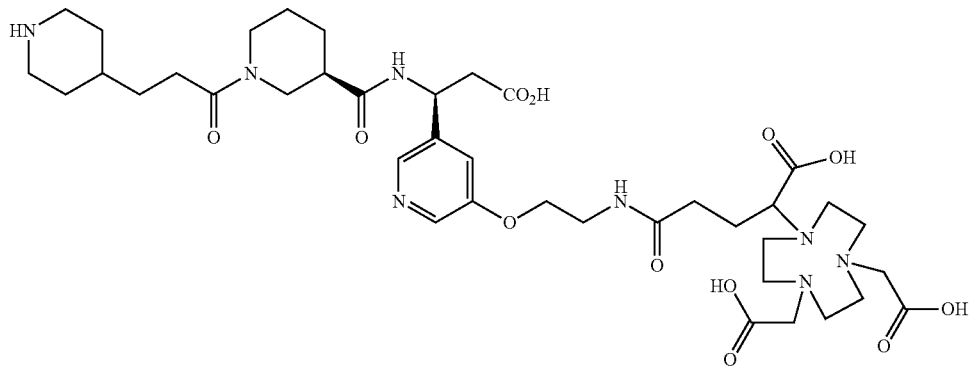

GP-103

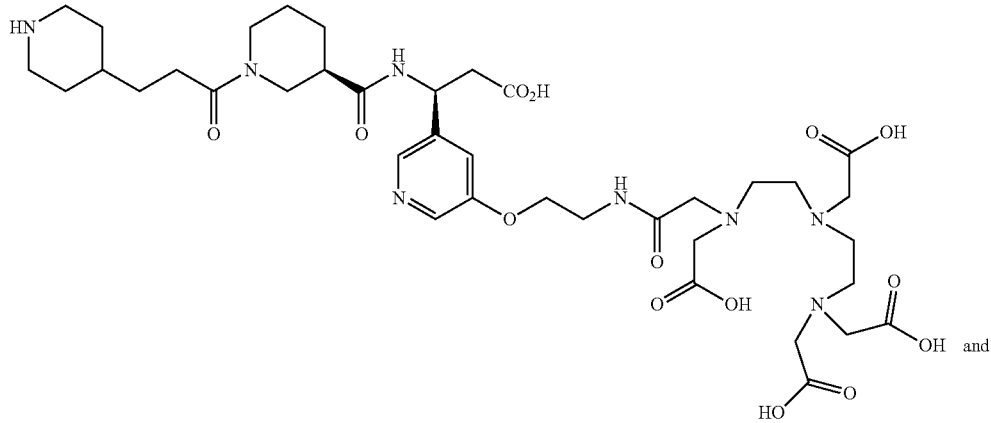

GP-104

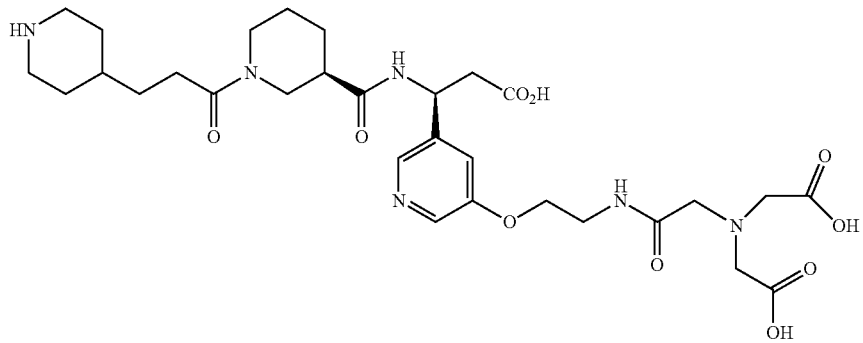

GP-105

In the present invention, the compound is used to mean including all of the compound itself, and a racemate, enantiomer, polymorph, hydrate, and solvate thereof.

The present invention may also include a pharmaceutically acceptable salt of the compound represented by Chemical Formula 1 as an active ingredient. In the present invention, the term "pharmaceutically acceptable salt" includes a salt derived from a pharmaceutically acceptable inorganic acid, organic acid, or base.

Examples of a suitable acid include hydrochloric acid, bromic acid, sulfuric acid, nitric acid, perchloric acid, fumaric acid, maleic acid, phosphoric acid, glycolic acid, lactic acid, salicylic acid, succinic acid, toluene-p-sulfonic acid, tartaric acid, acetic acid, citric acid, methanesulfonic acid, formic acid, benzoic acid, malonic acid, naphthalene-2-sulfonic acid, benzenesulfonic acid, and the like. An acid addition salt may be prepared by a typical method, for example, dissolving a compound in an excessive amount of an aqueous acid solution and precipitating the salt using a water-miscible organic solvent such as methanol, ethanol, acetone or acetonitrile. In addition, the acid addition salt may be prepared by heating the same molar amount of compound and an acid or alcohol in water, subsequently evaporating the mixture to dry the mixture, or suction-filtering the precipitated salt.

A salt derived from a suitable base may include an alkali metal such as sodium and potassium, an alkaline earth metal such as magnesium, ammonium and the like. An alkali metal or alkaline earth metal salt may be obtained by, for example, dissolving the compound in an excessive amount of an alkali metal hydroxide or alkaline earth metal hydroxide solution, filtering a non-soluble compound salt, evaporating the filtrate, and drying the resulting product. In this case, it is particularly suitable to prepare a sodium, potassium or calcium salt as the metal salt from the pharmaceutical perspective, and the corresponding silver salt may also be obtained by reacting an alkali metal or alkaline earth metal salt with a suitable silver salt (for example, silver nitrate).

As another aspect of the present invention, the present invention provides a thrombus imaging composition including the compound labeled with a metallic radioisotope or a pharmaceutically acceptable salt thereof as an active ingredient.

In the present invention, "thrombus" describes all types of blood clots (venous and arterial thrombi). "Thrombus" also includes any terms of phrases "thrombotic deposits" and "thrombus formation sites". A thrombus typically occurs as a result of the blood coagulation stage in hemostasis or pathologically as a result of various causes such as thrombotic disorders. In this investigation, all thrombi-containing platelets are included, as well as circulating thrombi (emboli), which have been immobilized anywhere in the vascular system.

In the present invention, the metallic radioisotope may be characterized by being selected from the group consisting of Ga-66, Ga-68, Cu-61, Cu-62, Cu-64, Cu-67, Pb-212, Bi-212, Pd-109, Y-86, Co-55, Zr-89, Sr-83, Mn-52, As-72, Sc-44, Ga-67, In-111, and Tc-99m, but is not limited thereto.

In another exemplary embodiment of the present invention, a compound labeled with the metallic radioisotope may be selected from the group consisting of the following Chemical Formula 2 to Chemical Formula 5, but is not limited thereto:

[Chemical Formula 2]

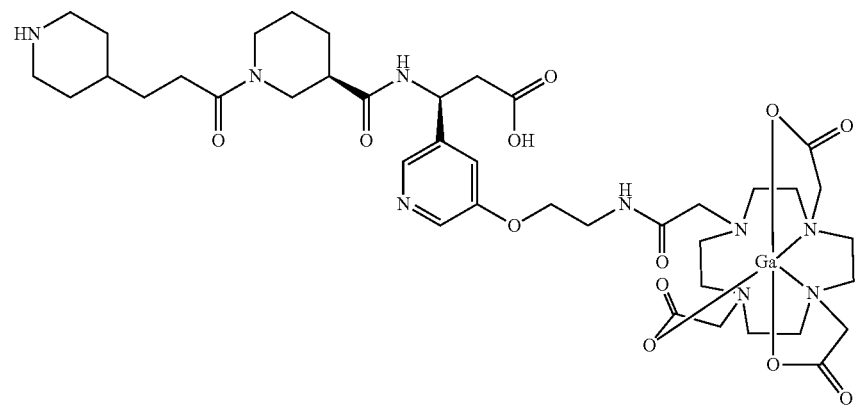

[Chemical Formula 3]

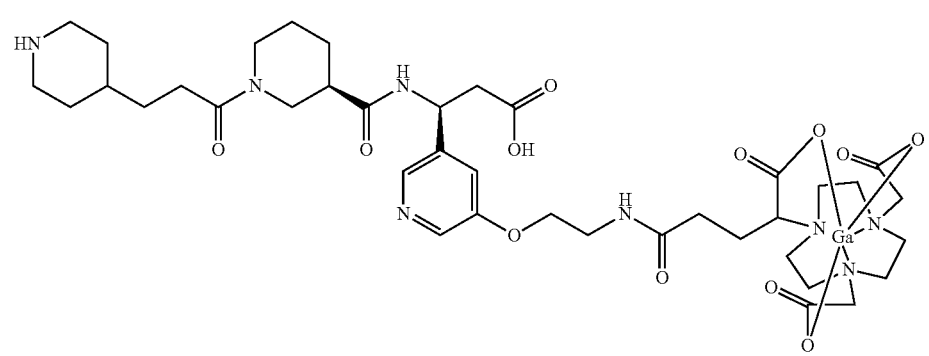

[Chemical Formula 4]

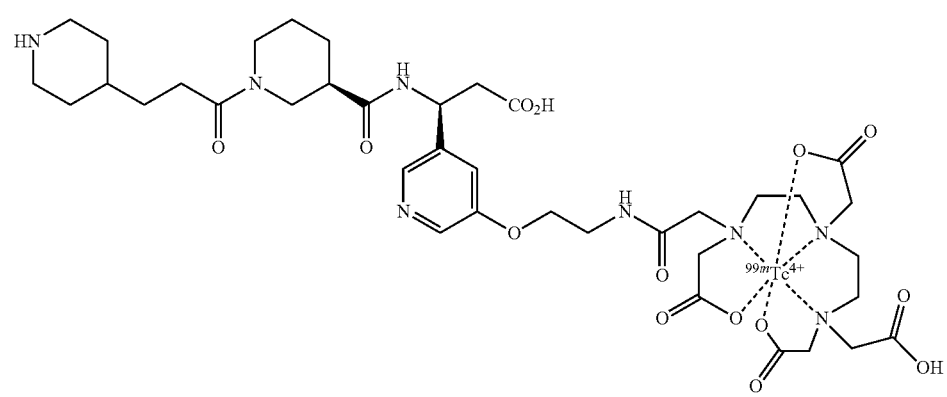

[Chemical Formula 5]

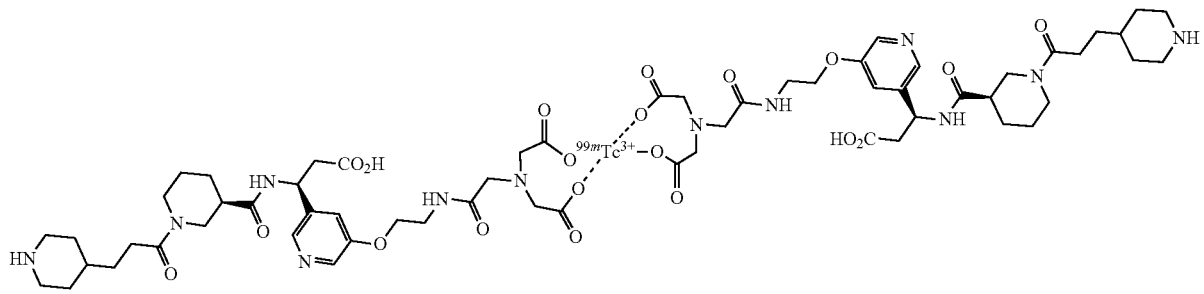

The pharmaceutical composition of the present invention may be administered to a subject in need via various routes. All modes of administration may be expected, but the pharmaceutical composition may be administered by, for example, oral administration, subcutaneous injection, peritoneal administration, intravenous injection, intramuscular injection, paraspinal space (intradural) injection, sublingual administration, buccal administration, intrarectal insertion, intravaginal injection, ocular administration, ear administration, nasal administration, inhalation, spraying via the mouth or nose, skin administration, transdermal administration, and the like.

The composition of the present invention is determined by the type of drug that is an active ingredient, as well as various related factors such as the disease to be diagnosed, the route of administration, the age, sex, and body weight of a patient, and the severity of the disease.

Injectable preparations, for example, sterile injectable aqueous or oleaginous suspensions, may be formulated as known in the art using suitable dispersing or wetting agents and suspending agents. A sterile injectable preparation may also be a sterile injectable solution, suspension or emulsion in a non-toxic parenterally acceptable diluent or solvent (for example, a solution in 1,3-butanediol). Among the acceptable vehicles and solvents that may be used are water, Ringer's solution, U.S.P. and an isotonic sodium chloride solution. In addition, sterile non-volatile oils are typically used as a solvent or suspending medium. For this purpose, any bland fatty oil can be used, for example, synthetic mono- or diglycerides. In addition, fatty acids such as oleic acid are used in the preparation of injectables.

The injectable formulations can be sterilized, for example, by filtration through a bacteria-retaining filter, or by incorporating sterilizing agents in the form of sterile solid compositions which can be dissolved or dispersed in sterile water or other sterile injectable media prior to use.

As used herein, the "individual" or "subject" refers to a subject in need of treatment of a disease, and more specifically, refers to a mammal such as a human or a non-human primate, a mouse, a rat, a dog, a cat, a horse, and a cow.

The "administration" as used herein refers to the provision of a predetermined composition of the present invention to a subject in need thereof by any suitable method.

In the present invention, diagnosis includes determining the susceptibility of a subject for a specific disease or disorder, that is, a subject to be tested, determining whether a subject currently has a specific disease or disorder, determining the prognosis of a subject with a specific disease or disorder (for example, identification of a thrombotic disease or thrombotic disease state, determining the stage of the thrombotic disease, or determining the responsiveness of the thrombotic disease to treatment), or therametrics (for example, monitoring the condition of a subject in order to provide information on therapeutic efficacy).

As used herein, the term "method for providing information" refers to a method for providing information regarding the diagnosis of a thrombotic disease, and to a method of obtaining information on the onset or likelihood (risk) of developing a thrombotic disease through imaging of a thrombus, in particular, detection of glycoprotein IIb/IIIa.

As used herein, the term detection refers to a meaning including both measuring and confirming whether a target material (an object to be detected, glycoprotein IIb/IIIa or a thrombus including the same in the present invention) is present (expressed), or measuring and confirming a change in the presence level (expression level) of a target material.

Furthermore, as another aspect of the present invention, the present invention provides a kit for preparing a metallic radioisotope-labeled radiopharmaceutical including the compound represented by Chemical Formula 1 or a pharmaceutically acceptable salt thereof as an active ingredient.

In the present invention, the kit may include one or more selected from the group consisting of cysteine, vitamin B1, and vitamin B6, but is not limited thereto.

In the present invention, the compound or a pharmaceutically acceptable salt thereof may be included in a kit in a state selected from the group consisting of a solution state, a refrigerated state, a frozen state, and a lyophilized state, but is not limited thereto.

In the present invention, the kit may include one or more selected from the group consisting of an HEPES buffer, an acetate buffer, ethanol, and water for injection, but is not limited thereto.

In the present invention, the kit may include a PS-H+ SPE cartridge, but is not limited thereto.

In the present invention, the kit may be frozen or lyophilized under an inert gas environment in a sterile container. The kit may be supplemented with a sterile buffer vial, saline, a syringe, a filter, a column and other auxiliary equipment to prepare an injectable for use by clinical pathologists or technicians. It is widely known to those of ordinary skill in the art that the kit can be varied and modified according to the patient's individual needs or diet or can be varied in the form in which a radioisotope can be provided or obtained.

A buffer useful in preparing the diagnostic composition and kit of the present invention includes, for example, phosphate, citrate, sulfosalicylate and acetate buffers. A lyophilizing aid useful in preparing the diagnostic composition and kit of the present invention includes, for example, mannitol, lactose, sorbitol, dextran, a FICOLL polymer and polyvinylpyrrolidone (PVP). A stabilizing aid useful in preparing the contrast agent and kit of the present invention includes, for example, ascorbic acid, cysteine, monothioglycerol, sodium bisulfite, sodium metabisulfite, gentisic acid and inositol. A solubilizing aid useful in preparing the diagnostic composition and kit of the present invention includes, for example, ethanol, glycerin, polyethylene glycol, propylene glycol, polyoxyethylene sorbitan monooleate, sorbitan monooleate, polysorbate, a poly(oxyethylene)-poly(oxypropylene)-poly(oxyethylene) block copolymer ("Pluronics") and lecithin. In any exemplary embodiment, examples of the solubilizing aid include polyethylene glycol, cyclodextrin and Pluronics. A bacteriostatic agent useful in preparing the diagnostic composition and kit of the present invention includes, for example, benzyl alcohol, benzalkonium chloride, chlorobutanol and methyl, propyl, or butyl paraben.

Whether the containers that contain the components in the kit of the present invention are bottles, vials (for example, vials including septa), ampules or infusion bags, and the like, it will also be appreciated that these containers may include additional indices, for example, typical markings that become discolored when a preparation is autoclaved or sterilized. The kit of the present invention may additionally include other components, for example, syringes, labels, vials, tubes, catheters, needles, pots, and the like.

Further, as still another exemplary aspect of the present invention, the present invention provides a pharmaceutical composition for diagnosing a thrombotic disease, including the thrombus imaging composition as an active ingredient.

In addition, as yet another exemplary aspect of the present invention, the present invention provides a use of the thrombus imaging composition for diagnosing a thrombotic disease.

In the present invention, the thrombotic disease may be selected from the group consisting of thrombosis, angina pectoris, myocardial infarction, arteriosclerosis, myocardial ischemia, solid tumors and metastatic cancer, but is not limited thereto.

The imaging method or diagnostic method according to the present invention uses the thrombus imaging composition according to the present invention, and the diagnostic method includes all known diagnostic methods present in the art.

Furthermore, as yet another exemplary aspect of the present invention, the present invention provides a method for preparing a compound represented by Chemical Formula 1, the method including: reacting a compound of the following Chemical Formula 6, in the presence of hexafluorophosphate benzotriazole tetramethyl uronium (HBTU) and hydroxybenzotriazole (HOBt), with one compound selected from the group consisting of

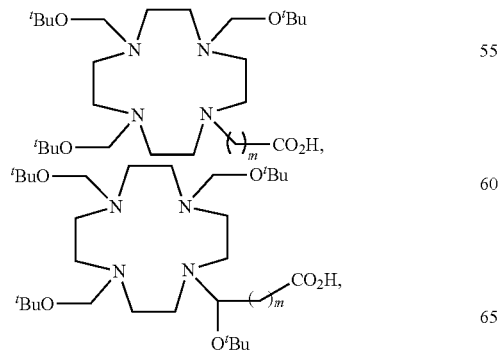

-continued

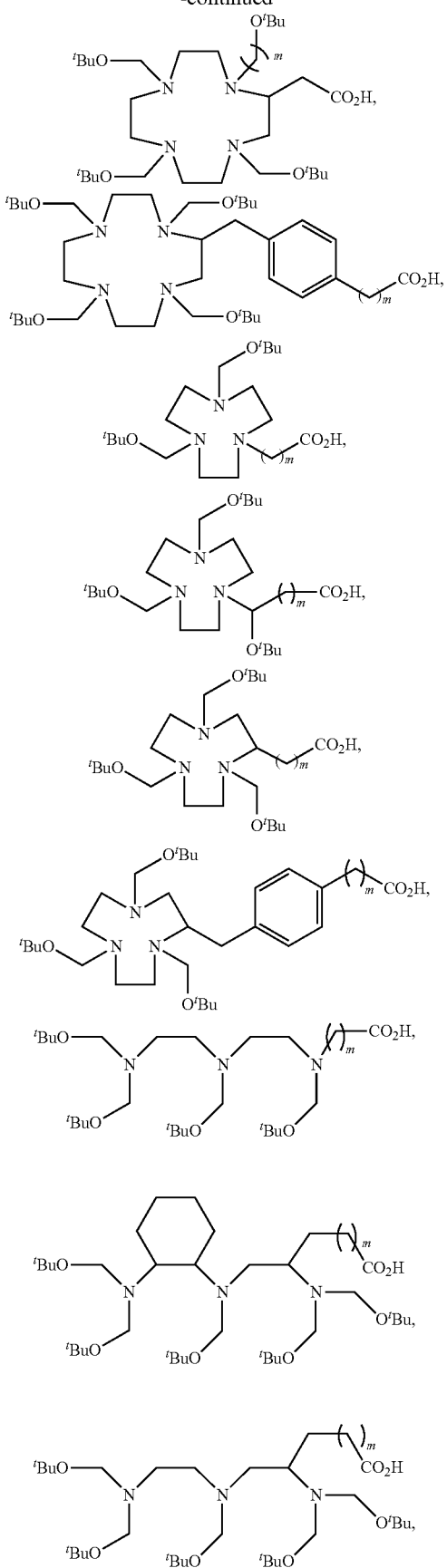

-continued

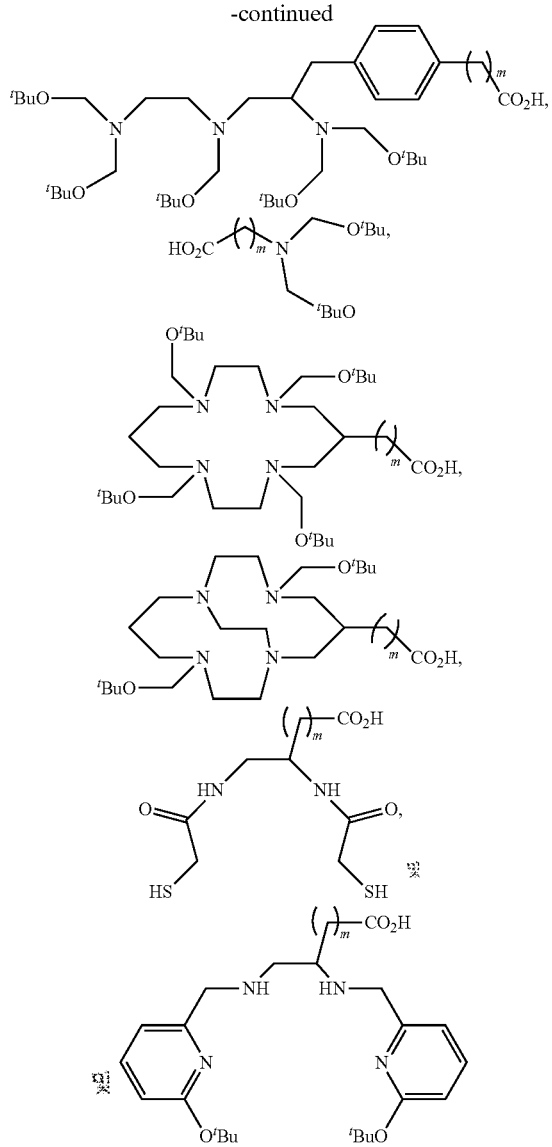

(m is an integer from 0 to 3).

[Chemical Formula 6]

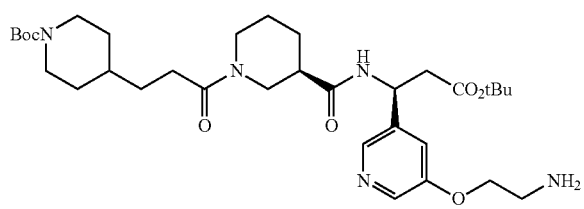

MODE FOR INVENTION

Hereinafter, preferred examples for helping with understanding of the present invention will be suggested. However, the following examples are provided only so that the present invention may be more easily understood, and the content of the present invention is not limited by the following examples.

Example 1. Synthesis of Compounds

Example 1-1. Synthesis of tert-butyl (R)-4-(3-(3-(ethoxycarbonyl)piperidin-1-yl)-3-oxopropyl)piperidine-1-carboxylate

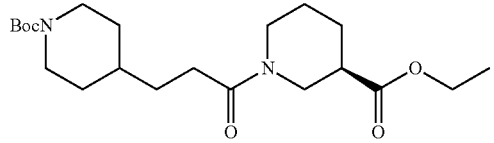 [SMILES: CCOC(=O)[C@@H]1CCCN(C(=O)CCC2CCN(C(=O)OC(C)(C)C)CC2)C1]

After 3-(1-(tert-butoxycarbonyl)piperidin-4-yl)propanoic acid (1) (367 mg, 2.3 mmol) dissolved in acetonitrile was put into a mixture of ethyl (R)-piperidine-3-carboxylate (2) (500 mg, 1.9 mmol), HBTU (872 mg, 2.3 mmol), HOBt (311 mg, 2.3 mmol), and DIPEA (0.81 mL, 4.6 mmol) at 0° C., the resulting mixture was reacted at room temperature. After 6 hours, an organic layer and an aqueous layer were separated by adding 100 mL of water and ethyl acetate (EA) thereto, and the organic layer was washed with a 1 M HCl aqueous solution (100 mL) and brine (100 mL), filtered with MgSO$_4$, and then concentrated. After the obtained residue was purified with a silica column (Hexane (Hx):EA=1:1), a final compound (3) (603 mg, 80%) was obtained.

Example 1-2. Synthesis of (R)-1-(3-(1-(tert-butoxycarbonyl)piperidin-4-yl)propanoyl)piperidine-3-carboxylic acid

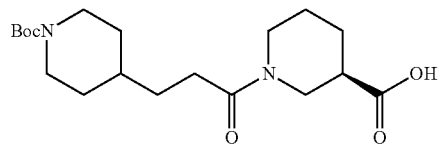 [SMILES: CC(C)(C)OC(=O)N1CCC(CCC(=O)N2CCC[C@@H](C(=O)O)C2)CC1]

After Compound (3) (tert-butyl (R)-4-(3-(3-(ethoxycarbonyl)piperidin-1-yl)-3-oxopropyl)piperidine-1-carboxylate, 500 mg, 1.26 mmol) dissolved in tetrahydrofuran (THF, 30 mL) was added to 5 mL of a LiOH (36 mg, 1.51 mmol) hydrate at 0° C., the resulting mixture was reacted at room temperature for 3 hours. EA was added to the reacted mixture, and the pH was adjusted to pH=4 by adding a 4 M HCl aqueous solution thereto. The mixture was separated into an organic layer and an aqueous layer by adding water and EA thereto, respectively, and the organic layer was filtered with MgSO$_4$ and then concentrated. A final compound (4) was obtained as a white solid (350 mg, 75%).

Example 1-3. Synthesis of 3-bromo-5-(2-((tert-butyldimethylsilyl)oxy)ethoxy)pyridine

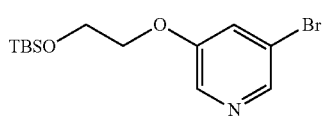 [SMILES: CC(C)(C)[Si](C)(C)OCCOc1cncc(Br)c1]

After a mixture of (2-bromoethoxy)(tert butyl)dimethylsilane (7.4 mL, 34.49 mmol) and K$_2$CO$_3$ (7.94 g, 57.5 mmol) was added to a solution of 3-bromo-5-hydroxypyridine (5) (5.00 g, 28.74 mmol) dissolved in degassed DMF (30 mL) at room temperature, the resulting mixture was reacted in a sealed reaction tube at 80° C. for 15 hours. A reaction product concentrated after the reaction was separated into an organic layer and an aqueous layer by adding water (800 mL) and EA (400 mL×3), respectively, and the organic layer was filtered with MgSO₄, and then concentrated. The residue was purified with a silica column (Hx:EA=5:1) to obtain a final compound (6) as an ivory solid (6.14 g, 64%).

Example 1-4. Synthesis of tert-butyl (E)-3-(5-(2-((tert-butyldimethylsilyl)oxy)ethoxy)pyridin-3-yl)acrylate

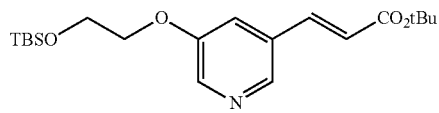 [SMILES: CC(C)(C)OC(=O)/C=C/c1cncc(OCCO[Si](C)(C)C(C)(C)C)c1]

After a mixture of tert-butyl acrylate (2.64 mL, 18.05 mmol), K₂CO₃ (3.33 g, 24 mmol), phenylurea (32.8 mg, 0.24 mmol), and palladium diacetate (134 mg, 0.6 mmol) was added to a solution of 3-bromo-5-(2-((tert-butyldimethylsilyl)oxy)ethoxy)pyridine (6) (4.00 g, 12.04 mmol) dissolved in degassed DMF (30 mL), the resulting mixture was reacted in a sealed reaction tube at 130° C. for 12 hours. The mixture concentrated after the reaction was separated into an organic layer and an aqueous layer by adding water (400 mL×3) and EA (800 mL), respectively, and the organic layer was filtered with MgSO₄, and then concentrated. The residue was purified with a silica column (Hx:EA=5:1) to obtain a final compound (7) as an ivory solid (6.14 g, 64%).

Example 1-5. Synthesis of (S)-tert-butyl 3-(benzyl((R)-1-phenylethyl)amino)-3-(5-(2-((tert butyldimethylsilyl)oxy)ethoxy)pyridin-3-yl)propanoate

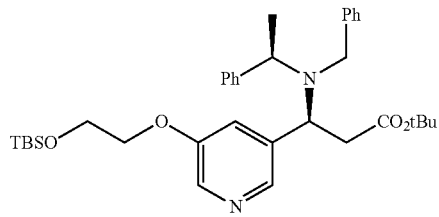 [SMILES: C[C@H](c1ccccc1)N(Cc1ccccc1)[C@@H](CC(=O)OC(C)(C)C)c1cncc(OCCO[Si](C)(C)C(C)(C)C)c1]

A 1.6 M n-BuLi/hexane (15.3 mL, 24.45 mmol) solution was slowly added to a solution of (R)-(+)—N-benzyl-alpha-methylbenzylamine (4.77 mL, 24.45 mmol) dissolved in anhydrous THF (50 mL) at −78° C., the resulting solution was stirred for 15 minutes, and then a solution of tert-butyl (E)-3-(5-(2-((tert-butyldimethylsilyl)oxy)ethoxy)pyridin-3-yl)acrylate (7) (5.6 g, 15.28 mmol) dissolved in anhydrous THF (25 mL) was added thereto, and the resulting mixture was reacted at −78° C. for 4 hours. After the reaction was terminated by adding a NH₄Cl aqueous solution thereto, the concentrated residue was separated and purified using DCM (1300 mL) and water (600 mL), and then the organic layer was filtered with MgSO₄, and then concentrated. The residue was purified with a silica column (Hx:EA=10:1) to obtain a final compound (8) in the form of a brown oil (3.7 g, 54%).

Example 1-6. Synthesis of tert-butyl (S)-3-amino-3-(5-(2-((tert-butyldimethylsilyl)oxy)ethoxy)pyridin-3-yl)propanoate

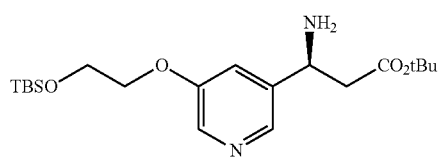 [SMILES: CC(C)(C)OC(=O)C[C@H](N)c1cncc(OCCO[Si](C)(C)C(C)(C)C)c1]

After 20% palladium hydroxide (752 mg, 20 wt %) was added to a solution of (S)-tert-butyl 3-(benzyl((R)-1-phenylethyl)amino)-3-(5-(2-((tert butyldimethylsilyl)oxy)ethoxy)pyridin-3-yl)propanoate (8) (3.7 g, 6.36 mmol) dissolved in MeOH (100 mL) in a H₂ (g) environment at room temperature, the resulting mixture was reacted for 72 hours. The reaction mixture was filtered through diatomaceous earth and then concentrated. Thereafter, the concentrated reaction mixture was purified with a silica column (Hx:EA=1:1 to DCM:MeOH=6:1 containing 2% TEA) to obtain a final compound (9) as a brown solid (1.8 g, 71%).

Example 1-7. Synthesis of tert-butyl 4-(3-((R)-3-(((S)-3-(tert-butoxy)-1-(5-(2-((tert-butyldimethylsilyl)oxy)ethoxy)pyridin-3-yl)-3-oxopropyl)carbamoyl)piperidin-1-yl)-3-oxopropyl)piperidine-1-carboxylate

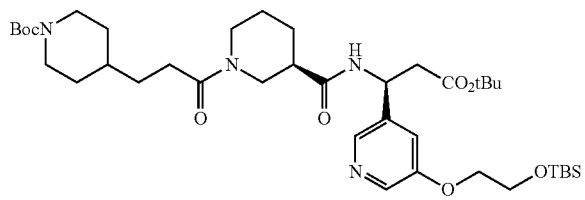 [SMILES: CC(C)(C)OC(=O)C[C@H](NC(=O)[C@@H]1CCCN(C(=O)CCC2CCN(C(=O)OC(C)(C)C)CC2)C1)c1cncc(OCCO[Si](C)(C)C(C)(C)C)c1]

After HBTU (1.89 g, 4.99 mmol), TEA (0.7 mL, 4.99 mmol), and (R)-1-(3-(1-(tert-butoxycarbonyl)piperidin-4-yl)propanoyl)piperidine-3-carboxylic acid (4) (1.8 g, 4.54 mmol) were added to a solution of (R)-1-(3-(1-(tert-butoxycarbonyl)piperidin-4-yl)propanoyl)piperidine-3-carboxylic acid (9) (2.34 g, 4.99 mmol) dissolved in DMF (40 mL) at room temperature, the resulting mixture was reacted for 12 hours. After the reaction, the mixture was concentrated and separated into an organic layer and an aqueous layer by adding water (300 mL) and EA (150 mL), respectively, and the organic layer was filtered with MgSO₄, and then concentrated. The residue was purified with a silica column (DCM:MeOH=20:1) to obtain a final compound (10) in the form of a solid (1.4 g, 76%).

Example 1-8. Synthesis of tert-butyl4-(3-((R)-3-(((S)-3-(tert-butoxy)-1-(5-(2-hydroxyethoxy)pyridin-3-yl)-3 oxopropyl)carbamoyl)piperidin-1-yl)-3-oxopropyl)piperidine-1-carboxylate

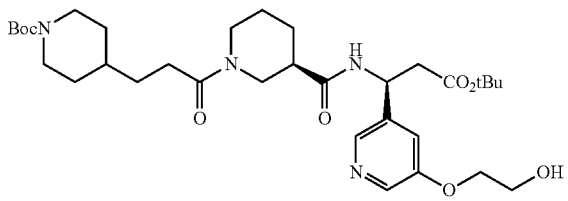 [SMILES: CC(C)(C)OC(=O)C[C@H](NC(=O)[C@@H]1CCCN(C(=O)CCC2CCN(C(=O)OC(C)(C)C)CC2)C1)c1cncc(OCCO)c1]

After a 1.0 M TBAF/THF solution was added to a solution of tert-butyl 4-(3-((R)-3-(((S)-3-(tert-butoxy)-1-(5-(2-((tert-butyldimethylsilyl)oxy)ethoxy)pyridin yl)-3-oxopropyl)carbamoyl)piperidin-1-yl)-3-oxopropyl)piperidine-1-carboxylate (10) (1.4 g, 1.87 mmol) dissolved in THF (30 mL) at room temperature, the resulting mixture was reacted for 4 hours. After the reaction, the mixture was concentrated and purified with a silica column (DCM:MeOH=20:1) to obtain a final compound (11) in the form of a solid (1.1 mg, 94%).

Example 1-9. Synthesis of tert-butyl 4-(3-((R)-3-(((S)-3-(tert-butoxy)-3-oxo-1-(5-(2-(tosyloxy)ethoxy)pyridin-3-yl)propyl)carbamoyl)piperidin-1-yl)-3-oxopropyl)piperidine-1-carboxylate

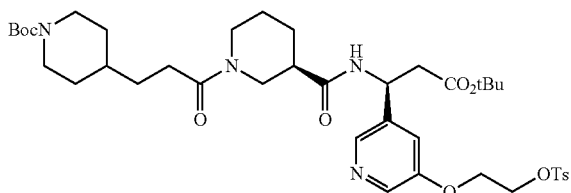

After TsCl (7.3 mg, 0.04 mmol) and TEA (6 mg, 0.04 mmol) were added to a solution of tert-butyl 4-(3-((R)-3-(((S)-3-(tert-butoxy)-1-(5-(2-hydroxyethoxy)pyridin-3-yl)-3 oxopropyl)carbamoyl)piperidin-1-yl)-3-oxopropyl)piperidine-1-carboxylate (11) (20 mg, 0.03 mmol) dissolved in DCM (1 mL) at room temperature, the resulting mixture was reacted for 12 hours. After the reaction, the mixture was concentrated and separated by adding water (150 mL) and DCM (300 mL), and an organic layer was filtered with MgSO$_4$, and then concentrated. The residue was purified with a silica column (DCM:MeOH=20:1) to obtain a final compound (12) in the form of a solid (20 mg, 83%).

Example 1-10. Synthesis of tert-butyl 4-(3-((R)-3-(((S)-1-(5-(2-azidoethoxy)pyridin-3-yl)-3-(tert-butoxy)-3-oxopropyl)carbamoyl)piperidin yl)-3-oxopropyl)piperidine-1-carboxylate

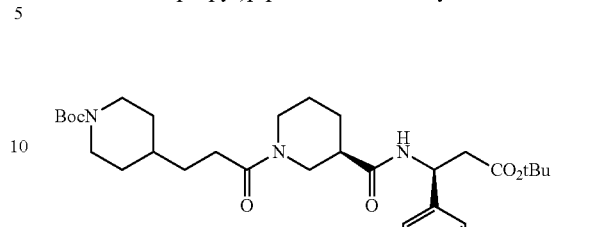

After sodium azide (12 mg, 0.18 mmol, 3.0 eq) was added to a solution of tert-butyl 4-(3-((R)-3-(0S)-3-(tert-butoxy)-3-oxo-1-(5-(2-(tosyloxy)ethoxy)pyridin-3-yl)propyl)carbamoyl)piperidin-1-yl)-3-oxopropyl)piperidine-1-carboxylate (12) (50 mg, 0.06 mmol) dissolved in DMF (0.5 mL), the resulting mixture was reacted at 80° C. for 6 hours. The mixture after the reaction was cooled, then diluted with EA, then purified with water and brine, then filtered with MgSO$_4$ and concentrated to obtain a final compound (13) in the form of a yellow solid (54 mg, 97%).

Example 1-11. Synthesis of tert-butyl 4-(3-((R)-3-(((S)-1-(5-(2-aminoethoxy)pyridin-3-yl)-3-(tert-butoxy)-3-oxopropyl)carbamoyl)piperidin-1-yl)-3-oxopropyl)piperidine-1-carboxylate (GP-101)

GP-101

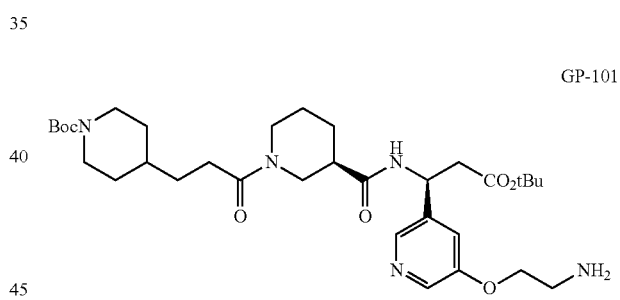

After 20% palladium hydroxide (752 mg, 20 wt %) was added to a solution of (tert-butyl 4-(3-((R)-3-(((S)-1-(5-(2-azidoethoxy)pyridin-3-yl)-3-(tert-butoxy) oxopropyl)carbamoyl)piperidin-1-yl)-3-oxopropyl)piperidine-1-carboxlate (13) (50 mg, 0.08 mmol) dissolved in MeOH (1 mL) in a H$_2$ (g) environment at room temperature, the resulting mixture was reacted for 17 hours. The reaction mixture was filtered through diatomaceous earth, then concentrated and purified with a silica column (DCM:MeOH=6:1 containing 2% TEA). An obtained final compound (42 mg, 84%) in the form of a colorless oil was analyzed with $^1$H-NMR.

The $^1$H-NMR analysis results of the GP-101 compound are as follows: (using pyridine): δ 8.21-8.18 (m, 2H), 5.38-5.35 (m, 1H), 4.14-3.90 (m, 2H), 3.58-3.44 (m, 2H), 3.10-3.08 (m, 1H), 2.78-2.66 (m, 5H), 2.42-2.28 (m, 3H), 1.91-1.80 (m, 2H), 1.70-1.63 (m, 3H), 1.61-1.55 (m, 2H), 1.44 (s, 11H), 1.35 (s, 11H), 1.16-1.07 (m, 3H), 1.06-0.84 (m, 2H)

Example 1-12. Synthesis of tri-tert-butyl 2,2',2"-(10-(2-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-2-oxoethyl)-1,4,7,10-tetraazacyclododecane-1,4,7-triyl)triacetate

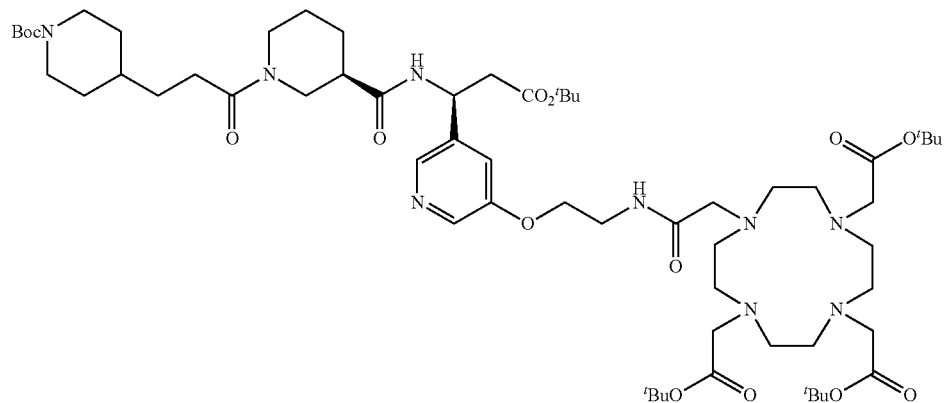 [SMILES: CC(C)(C)OC(=O)C[C@H](NC(=O)[C@@H]1CCCN(C(=O)CCC2CCN(C(=O)OC(C)(C)C)CC2)C1)c1cncc(OCCNC(=O)CN2CCN(CC(=O)OC(C)(C)C)CCN(CC(=O)OC(C)(C)C)CCN(CC(=O)OC(C)(C)C)CC2)c1]

Tert-butyl 4-(3-((R)-3-(((S)-1-(5-(2-aminoethoxy)pyridin-3-yl)-3-(tert-butoxy)-3-oxopropyl)carbamoyl)piperidin-1-yl)-3-oxopropyl)piperidine carboxylate (GP-101) (56 mg, 0.08 mmol), HBTU (40 mg, 0.10 mmol) and HOBt (14 mg, 0.10 mmol) were added to a solution of (2-(4,7,10-tris(2-(tert-butoxy)-2-oxoethyl)-1,4,7,10-tetraazacyclododecan-1-yl)acetic acid (60 mg, 0.10 mmol) dissolved in DMF (1 mL), TEA (30 μL, 0.2 mmol) was added thereto in a $N_2$ (g) environment at room temperature, and the resulting mixture was reacted at room temperature for 4 hours. The reaction mixture was separated into an organic layer and an aqueous layer by adding water (150 mL) and EA (300 mL), respectively, and the organic layer was filtered with $MgSO_4$, and then concentrated. The residue was purified with a silica column (DCM:MeOH=20:1) to obtain a final compound (14) in the form of a solid (70 mg, 67%).

Example 1-13. Synthesis of 2,2',2"-(10-(2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)-1,4,7,10-tetraazacyclododecane-1,4,7-triyl)triacetic acid (GP-102)

GP-102

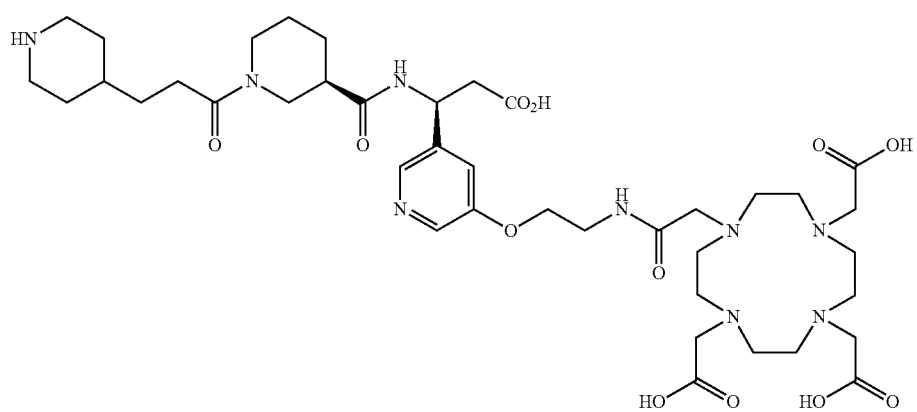

3 mL of 4N—HCl/1,4-dioxane was added to a solution of tri-tert-butyl 2,2',2''-(10-(2-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-2-oxoethyl)-1,4,7,10-tetraazacyclododecane-1,4,7-triyl)triacetate (14) (70 mg, 0.059 mmol) dissolved in DCM (1 mL) at room temperature, and the resulting mixture was reacted in the same environment for 48 hours. The reaction mixture was concentrated and purified with DCM slurry to obtain a solid final compound (20 mg, 39%).

Solid GP-102 (10 mg) was dissolved in ACN/water (25 mL/25 mL), and 0.5 mL of the resulting solution was transferred to each of 100 vials, and the vials were lyophilized under the condition of −40° C. for 3 hours. Then, after the vacuum was activated, the vials were lyophilized under the condition of −40° C. for 1 day, under the condition of 0° C. for 1 day, and under the condition of 25° C. for 4 hours. After the vial mouth was closed with a rubber stopper, the vacuum was released, and dried GP-102 obtained in an amount of 0.1 mg per vial was closed with an aluminum stopper and then stored under the condition of −20° C. (Mass spectrometry (Agilent 6120. Single quadrupole) [M+Na] 884.4).

The $^1$H-NMR analysis results of GP-102 are as follows: (BRUKER, MeOD, 400 MHz NMR): δ 8.58-8.52 (m, 2H), 8.32-8.27 (m, 1H), 5.44-5.39 (m, 1H), 4.41-4.26 (m, 4H), 3.95-3.85 (m, 4H), 3.85-3.67 (m, 6H), 3.67-3.36 (m, 11H), 3.20-3.18 (m, 4H), 3.05-2.96 (m, 7H), 2.83-2.80 (m, 2H), 2.61-2.46 (m, 3H), 2.04-1.98 (m, 3H), 1.73-1.30 (m, 10H)

Example 1-14. Synthesis of di-tert-butyl 2,2'-(7-(1-(tert-butoxy)-5-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-1,5-dioxopentan-2-yl)-1,4,7-triazonane-1,4-diyl)diacetate

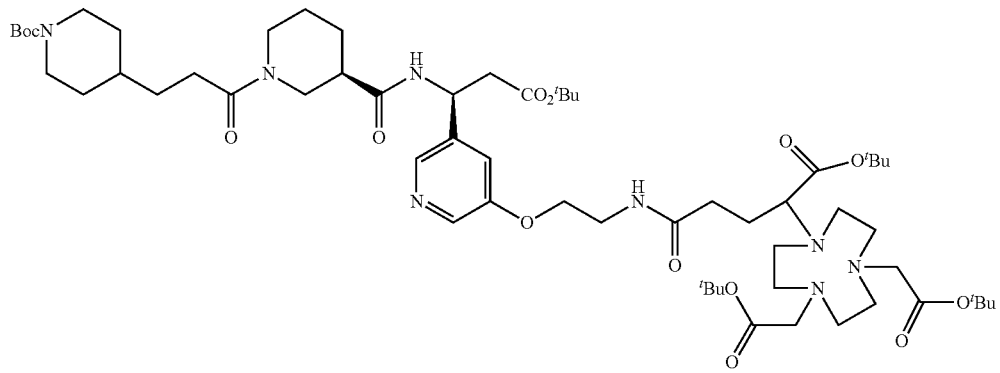

GP-103

Tert-butyl 4-(3-((R)-3-(((S)-1-(5-(2-aminoethoxy)pyridin-3-yl)-3-(tert-butoxy)-3-oxopropyl)carbamoyl)piperidin-1-yl)-3-oxopropyl)piperidine-1-carboxylate (GP-101) (56 mg, 0.08 mmol), HBTU (40 mg, 0.10 mmol), and HOBt (14 mg, 0.10 mmol) were added to a solution of 4-(4,7-bis(2-(tert-butoxy)-2-oxoethyl)-1,4,7-triazonan-1-yl)-5-(tert-butoxy)-5-oxopentanoic acid (60 mg, 0.10 mmol) dissolved in DMF (1 mL), TEA (30 μL, 0.2 mmol) was added thereto in a N$_2$ (g) environment at room temperature, and the resulting mixture was reacted at room temperature for 4 hours. The reaction mixture was separated into an organic layer and an aqueous layer by adding water (150 mL) and EA (300 mL), respectively, and the organic layer was filtered with MgSO$_4$, and then concentrated. The residue was purified with a silica column (DCM:MeOH=20:1) to obtain a final compound (15) in the form of a solid (70 mg, 67%).

Example 1-15. Synthesis of 2,2'-(7-(1-carboxy-4-((2-((5-((S)-2-carboxy-1-((R)-1-(3-(piperidin-4-yl)propanoyl)piperidine-3-carboxamido)ethyl)pyridin-3-yl)oxy)ethyl)amino)-4-oxobutyl)-1,4,7-triazonane-1,4-diyl)diacetic acid (GP-103)

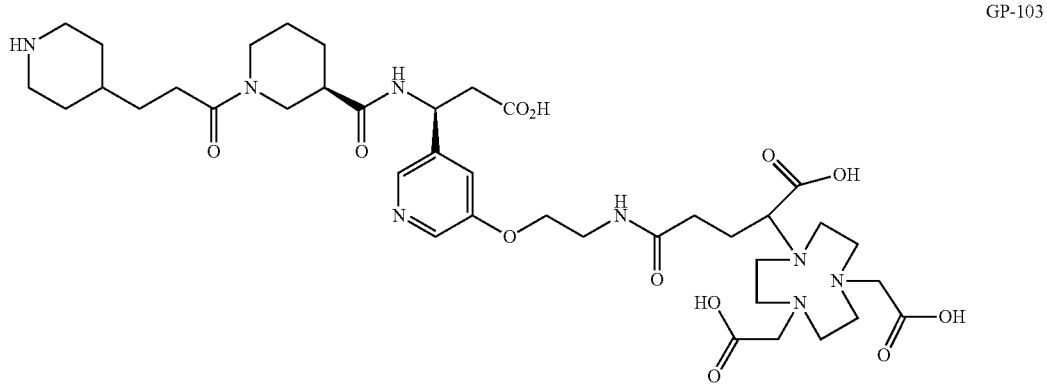 [SMILES: O=C(O)C[C@H](NC(=O)[C@@H]1CCCN(C(=O)CCC2CCNCC2)C1)c1cncc(OCCNC(=O)CCC(C(=O)O)N2CCN(CC(=O)O)CCN(CC(=O)O)CC2)c1]

GP-103

3 mL of 4N—HCl/1,4-dioxane was added to a solution of di-tert-butyl 2,2'-(7-(1-(tert-butoxy)-5-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-1,5-dioxopentan-2-yl)-1,4,7-triazonane-1,4-diyl)diacetate (15) (70 mg, 0.059 mmol) dissolved in DCM (1 mL) at room temperature, and the resulting mixture was reacted in the same environment for 48 hours. The reaction mixture was purified with DCM slurry to obtain a solid final compound (20 mg, 39%). Solid GP-103 (10 mg) was dissolved in ACN/water (25 mL/25 mL), and 0.5 mL of the resulting solution was transferred to each of 100 vials, and the vials were lyophilized under the condition of −40° C. for 3 hours. Then, after the vacuum was activated, the vials were lyophilized under the condition of −40° C. for 1 day, under the condition of 0° C. for 1 day, and under the condition of 25° C. for 4 hours. After the vial mouth was closed with a rubber stopper, the vacuum was released, and dried GP-103 obtained in an amount of 0.1 mg per vial was closed with an aluminum stopper and then stored under the condition of −20° C. (Mass spectrometry (Agilent 6120. Single quadrupole) [M+Na] 833.4).

The $^1$H-NMR analysis results of GP-103 are as follows: (BRUKER, MeOD, 400 MHz NMR): δ 8.34-8.33 (m, 2H), 8.04-8.03 (m, 1H), 5.32-5.31 (m, 1H), 4.21 (s, 2H), 4.18-3.98 (m, 1H), 3.75 (s, 4H), 3.64 (s, 2H), 3.57-3.54 (m, 2H), 3.47 (t, J=7.2 Hz, 1H), 3.30 (d, J=12.8 Hz, 2H), 3.14-3.05 (m, 6H), 2.96-2.83 (m, 7H), 2.40-2.34 (m, 4H), 2.11 (s, 5H), 1.90-1.84 (m, 3H), 1.60-1.44 (m, 5H), 1.33-1.26 (m, 2H)

Example 1-16. Synthesis of tert-butyl 4-(3-((R)-3-(((S)-3-(tert-butoxy)-1-(5-(2-(2-tetra-tert-butyl-DTPA acetamido)ethoxy)pyridin-3-yl)-3-oxopropyl)carbamoyl)piperidin-1-yl)-3-oxopropyl)piperidine-1-carboxylate

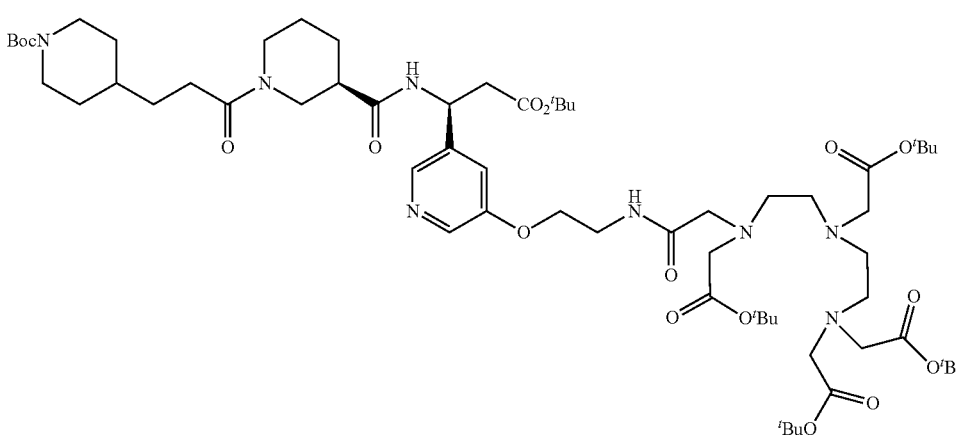

GP-104

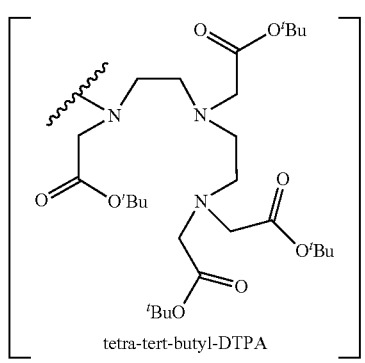

tetra-tert-butyl-DTPA

Tert-butyl 4-(3-((R)-3-(((S)-1-(5-(2-aminoethoxy)pyridin-3-yl)-3-(tert-butoxy)-3-oxopropyl)carbamoyl)piperidin-1-yl)-3-oxopropyl)piperidine-1-carboxylate (GP-101) (200 mg, 0.32 mmol), HBTU (144 mg, 0.38 mmol) and HOBt (51 mg, 0.38 mmol) were added to a solution of 3,6,9-tris(2-(tert-butoxy)-2-oxo ethyl)-13,13-dimethyl-11-oxo-12-oxa-3,6,9-triazatetradecanoic acid (235 mg, 0.38 mmol) dissolved in DMF (1 mL), DIPEA (132 μL, 0.76 mmol) was added thereto in a $N_2$ (g) environment at room temperature, and the resulting mixture was reacted at room temperature for 4 hours. The reaction mixture was separated into an organic layer and an aqueous layer by adding water (150 mL) and EA (300 mL), respectively, and the organic layer was filtered with $MgSO_4$, and then concentrated. The residue was purified with a silica column (DCM:MeOH=20:1) to obtain a final compound (16) in the form of a solid (236 mg, 60%).

Example 1-17. Synthesis of (S)-3-(5-(2-(2-DTPA acetamido)ethoxy)pyridin-3-yl)-3-((R)-1-(3-(piperidin-4-yl)propanoyl)piperidine-3-carboxamido)propanoic acid (GP-104)

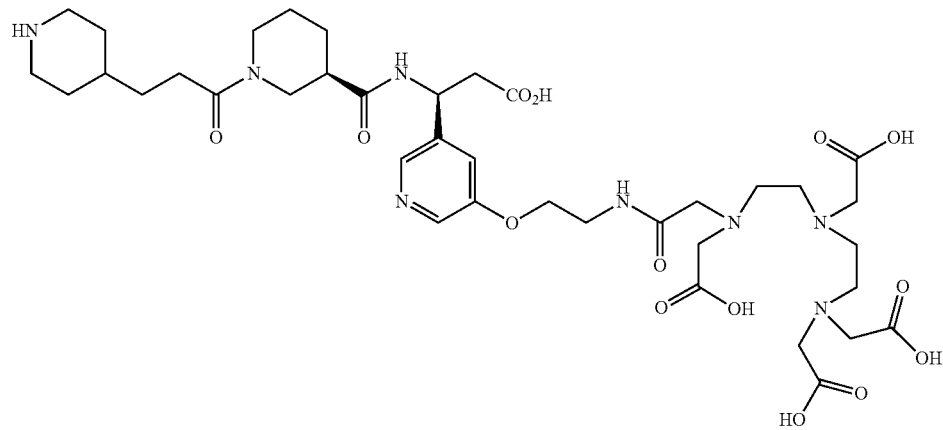

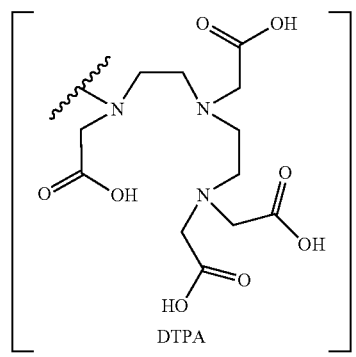

DTPA 4 mL of 4N—HCl/1,4-dioxane was added to a solution of tert-butyl 4-(3-((R)-3-(((S)-3-(tert-butoxy)-1-(5-(2-(2-tetra-tert-butyl-DTPA acetamido)ethoxy)pyridin yl)-3-oxopropyl)carbamoyl)piperidin-1-yl)-3-oxopropyl)piperidine-1-carboxylate (16) (210 mg, 0.17 mmol) dissolved in DCM (1 mL) at room temperature, and the resulting mixture was reacted in the same environment for 48 hours. The reaction mixture was concentrated and purified with DCM slurry to obtain a solid final compound (60 mg, 41%). Mass spectrometry (Agilent 6120. Single quadrupole) [M+H] 851.4

The $^1$H-NMR analysis results of GP-104 are as follows: (BRUKER, MeOD, 400 MHz NMR): δ 8.59-8.53 (m, 2H), 8.39-8.35 (m, 1H), 5.46-5.41 (m, 1H), 4.40-4.34 (m, 7H), 4.31-4.23 (m, 6H), 3.85-3.79 (m, 2H), 3.75-3.68 (m, 6H), 3.68-3.58 (m, 4H), 3.42-3.35 (m, 3H), 3.29-3.19 (m, 4H), 3.07-2.96 (m, 3H), 2.89-2.88 (m, 1H), 2.61-2.46 (m, 2H), 2.04-1.97 (m, 3H), 1.84-1.50 (m, 5H), 1.50-1.30 (m, 2H)

Example 1-18. Synthesis of di-tert-butyl 2,2'-((2-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-2-oxoethyl)azanediyl)diacetate

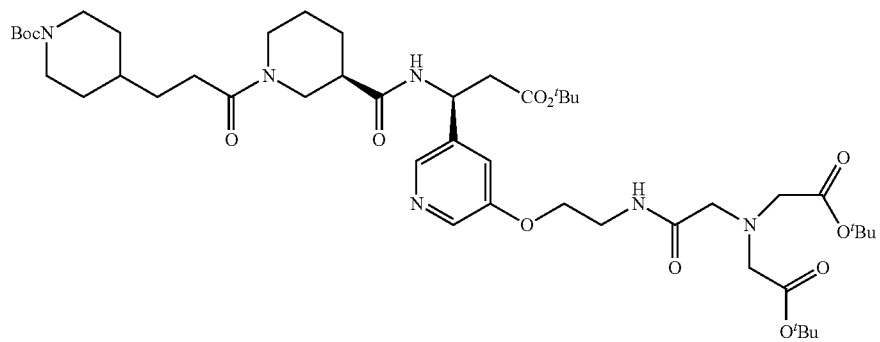 [SMILES: CC(C)(C)OC(=O)C[C@H](NC(=O)[C@@H]1CCCN(C(=O)CCC2CCN(C(=O)OC(C)(C)C)CC2)C1)c1cncc(OCCNC(=O)CN(CC(=O)OC(C)(C)C)CC(=O)OC(C)(C)C)c1]

Tert-butyl 4-(3-((R)-3-(((S)-1-(5-(2-aminoethoxy)pyridin-3-yl)-3-(tert-butoxy)-3-oxopropyl)carbamoyl)piperidin-1-yl)-3-oxopropyl)piperidine carboxylate (GP-101) (200 mg, 0.32 mmol), HBTU (144 mg, 0.38 mmol) and HOBt (51 mg, 0.38 mmol) were added to a solution of bis(2-(tert-butoxy)-2-oxoethyl)glycine (115 mg, 0.38 mmol) dissolved in DMF (1 mL), DIPEA (132 μL, 0.76 mmol) was added thereto in a $N_2$ (g) environment, and the resulting mixture was reacted at room temperature for 4 hours. The reaction mixture was separated into an organic layer and an aqueous layer by adding water (150 mL) and EA (300 mL), respectively, and the organic layer was filtered with MgSO$_4$, and then concentrated. The residue was purified with a silica column (DCM:MeOH=20:1) to obtain a final compound (17) in the form of a solid (190 mg, 65%).

Example 1-19. Synthesis of 2,2'-((2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)azanediyl)diacetic acid (GP-105)

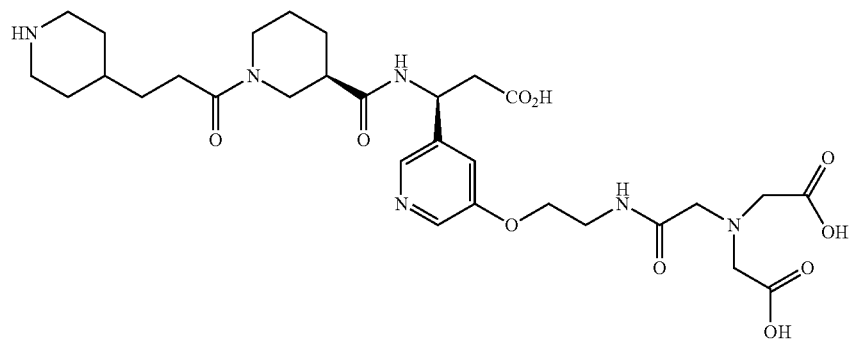

4 mL of 4N—HCl/1,4-dioxane was added to a solution of di-tert-butyl 2,2'-((2-((2-((5-((S)-3-(tert-butoxy)-1-((R)-1-(3-(1-(tert-butoxycarbonyl)piperidin-4-yl)propanoyl)piperidine-3-carboxamido)-3-oxopropyl)pyridin-3-yl)oxy)ethyl)amino)-2-oxoethyl)azanediyl)diacetate (17) (180 mg, 0.20 mmol) dissolved in DCM (1 mL) at room temperature, and the resulting mixture was reacted in the same environment for 48 hours. The reaction mixture was concentrated and purified with DCM slurry to obtain a solid final compound (65 mg, 51%). The reaction mixture was concentrated and purified with DCM slurry to obtain a solid final compound (20 mg, 39%).

Solid GP-105 (50 mg) was dissolved in ACN/water (5 mL/5 mL), and 0.5 mL of the resulting solution was transferred to each of 20 vials, and the vials were lyophilized under the condition of −40° C. for 3 hours. Then, after the vacuum was activated, the vials were lyophilized under the condition of −40° C. for 1 day, under the condition of 0° C. for 1 day, and under the condition of 25° C. for 4 hours. After the vial mouth was closed with a rubber stopper, the vacuum was released, and dried GP-105 obtained in an amount of 0.1 mg per vial was closed with an aluminum stopper and then stored under the condition of −20° C. Mass spectrometry (Agilent 6120. Single quadrupole) [M+H] 649.3

The $^1$H-NMR analysis results of GP-105 are as follows: (BRUKER, MeOD, 400 MHz NMR): δ 8.57-8.52 (m, 2H), 8.33-8.28 (m, 1H), 5.45-5.38 (m, 1H), 4.39-4.25 (m, 9H), 3.77-3.68 (m, 3H), 3.42-3.37 (m, 3H), 3.01-2.98 (m, 5H), 2.88-2.84 (m, 1H), 2.54-2.46 (m, 3H), 2.05 (s, 1H), 2.04-1.98 (m, 3H), 1.72-1.39 (m, 9H)

Example 2. Radioisotope Labeling

Example 2-1. Radioisotope Labeling of GP-102 Using HEPES Buffer

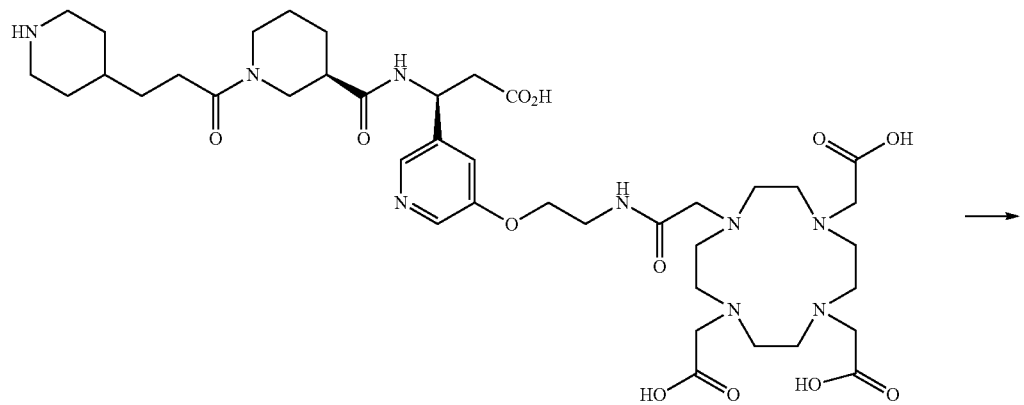

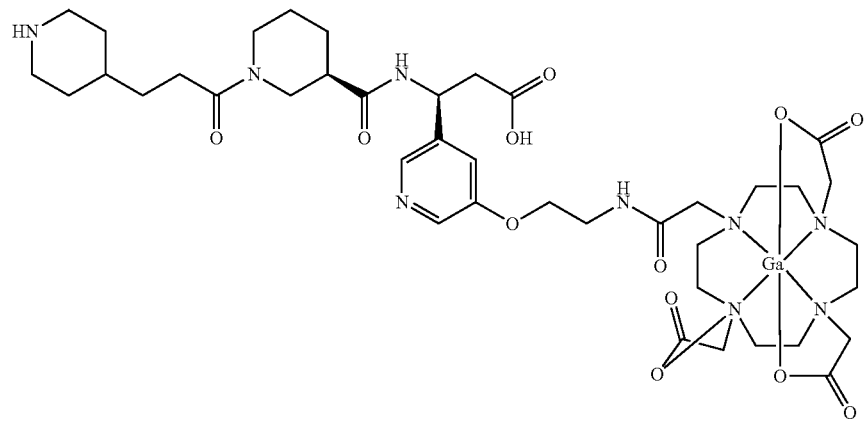

2 mL of 0.6 N HCl including 205 MBq Ga-68 was neutralized with sodium acetate, and then mixed with a solution obtained by dissolving 0.05 to 0.1 mg of a GP-102 precursor in a 1 M HEPES buffer (pH 4) solution, and the resulting mixture was reacted at 100° C. for 10 minutes. The reaction mixture was trapped in a C18 light Sep-Pak to remove unreacted Ga-68 and an HEPES buffer with water for injection and eluted using 50% ethanol to obtain 106 to 451.77 MBq [Ga-68]GP-102 with a yield of 30.53 to 51.71%, and the purity confirmed with HPLC (analysis conditions: Luna C18 250×4.6 mm, an aqueous solution of 0.1% acetic acid and 3% methanol:methanol (100:0, 0 to 10 minutes; 80:20, 10 to 15 minutes; 80:20, 29 minutes; 100:0, 19.1 minutes; 100:0. 35 minutes), 1.0 mL/min, UV=254 nm) was 91.6%.

The results are illustrated in FIG. 1.

Example 2-2. Radioisotope Labeling of GP-102 Using Acetate Buffer 2 mL of 0.6 N HCl including 207 MBq Ga-68 was neutralized with sodium acetate, and then mixed with a solution obtained by dissolving 0.05 mg of a GP-102 precursor in a 1 M sodium acetate buffer solution, and the resulting mixture was reacted at 100° C. for 10 minutes. It was confirmed that the labeling efficiency of the reaction mixture was 55.7% by HPLC, the reaction mixture was trapped in a C18 light Sep-Pak to remove unreacted Ga-68 with water for injection and eluted using 50% ethanol to obtain 58 MBq [Ga-68]GP-102 with a yield of 28%, and the purity confirmed by HPLC in the same manner as in Example 2-1 was 90.6%.

Figure 2:
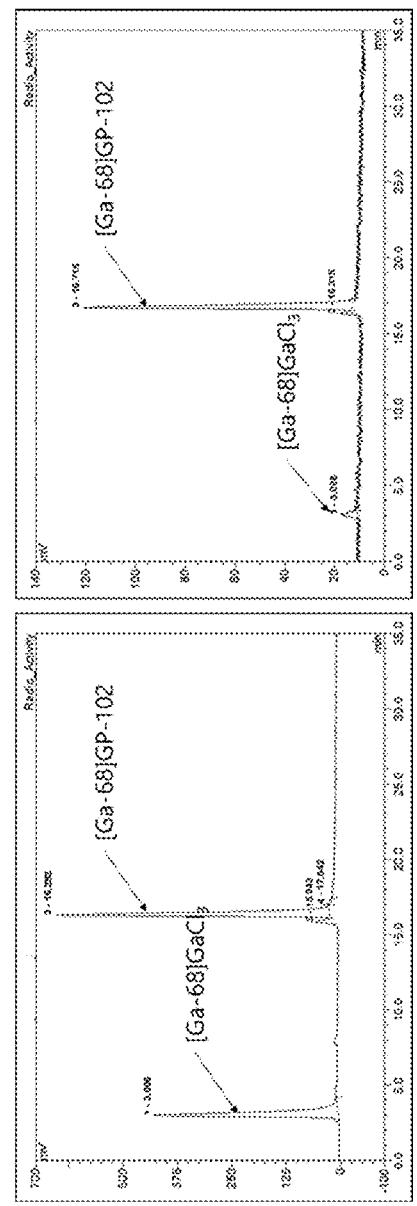
FIG. 2 illustrates the results of purifying [Ga-68]GP-102 labeled with Ga-68 using an acetate buffer with C18 light Sep-Pak.

The results are illustrated in FIG. 2.

Example 2-3. Radioisotope Labeling of GP-102 Using Acetate Buffer Kit

Ga-68 was used after purification using a Chromafix (PS-H+) cartridge, and after purification, the purified Ga-68 was mixed with a solution obtained by dissolving 0.05 mg of a GP-102 precursor in a NaCl solution including 132 MBq Ga-68 in a 1 M sodium acetate buffer solution, and the resulting mixture was reacted at 100° C. for 10 minutes. It was confirmed that the labeling efficiency of the reaction mixture was 90.1% by HPLC, 92 MBq [Ga-68]GP-102 was obtained with a high yield of 69.7% without SPE purification of the reaction mixture, and the purity confirmed by HPLC in the same manner as in Example 2-1 was 96.9%.

Figure 3:
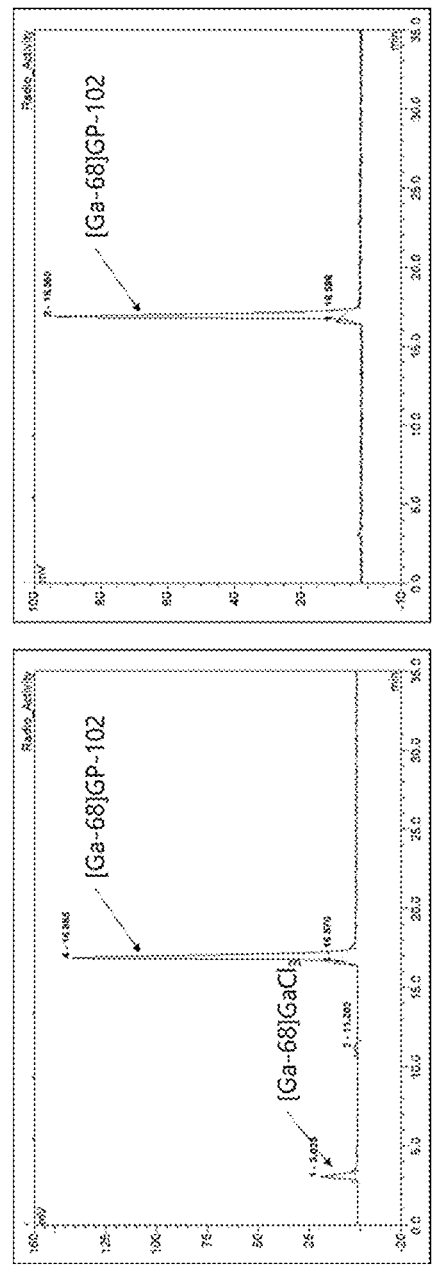
FIG. 3 illustrates the results of confirming [Ga-68]GP-102 labeled with Ga-68 using Chromafix PS-H+ and an acetate buffer kit without any purification.

The results are illustrated in FIG. 3.

Example 2-4. Radioisotope Labeling of GP-103 Using HEPES Buffer

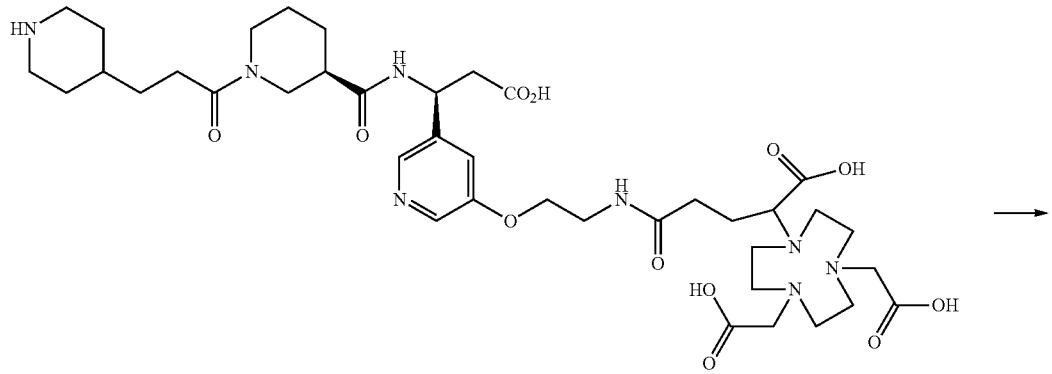

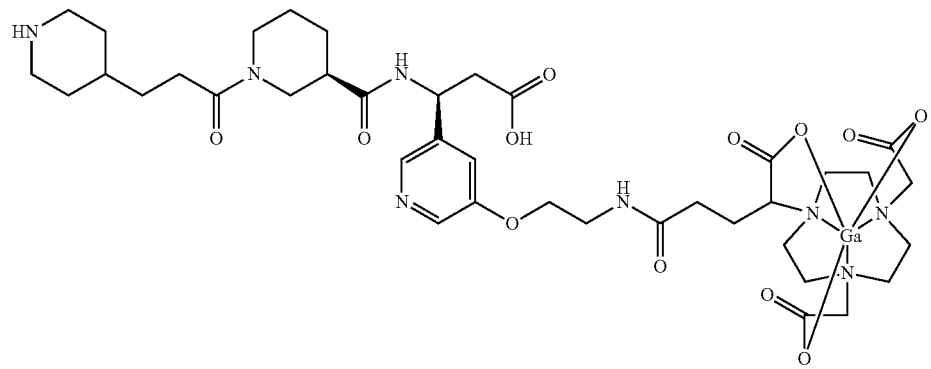

2 mL of 0.6 N HCl including 194 MBq Ga-68 was neutralized with sodium acetate, and then mixed with a solution obtained by dissolving 0.05 mg of a GP-103 precursor in a 1 M HEPES buffer (pH 4) solution, and the resulting mixture was allowed to stand at room temperature for 10 minutes. The reaction mixture was trapped in a C18 light Sep-Pak to remove unreacted Ga-68 and an HEPES buffer with water for injection and eluted using 50% ethanol to obtain 154 MBq [Ga-68]GP-103 with a yield of 79.71%, and the purity confirmed by HPLC in the same manner as in Example 2-1 was 97.2%.

Figure 4:
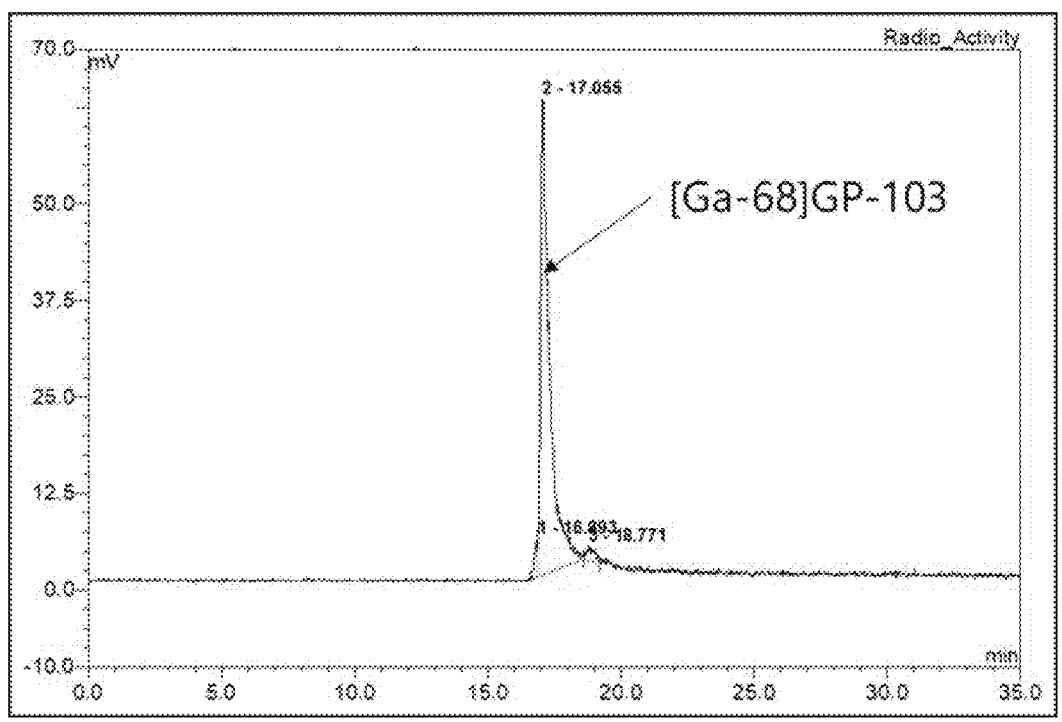
FIG. 4 illustrates the results of purifying [Ga-68]GP-103 labeled with Ga-68 using an HEPES buffer with C18 light Sep-Pak.

The results are illustrated in FIG. 4.

Example 2-5. Radioisotope Labeling of GP-103 Using Acetate Buffer 2 mL of 0.6 N HCl including 184 MBq Ga-68 was mixed with a 4.4 M sodium acetate buffer solution in which 0.05 mg of a GP-103 precursor was dissolved, and the resulting mixture was allowed to stand at room temperature for 10 minutes. The reaction mixture was trapped in a C18 light Sep-Pak to remove unreacted Ga-68 and an HEPES buffer with water for injection and eluted using 50% ethanol to obtain 115 MBq [Ga-68]GP-103 with a yield of 62.9%, and the purity confirmed by HPLC in the same manner as in Example 2-1 was 92.9%.

Figure 5:
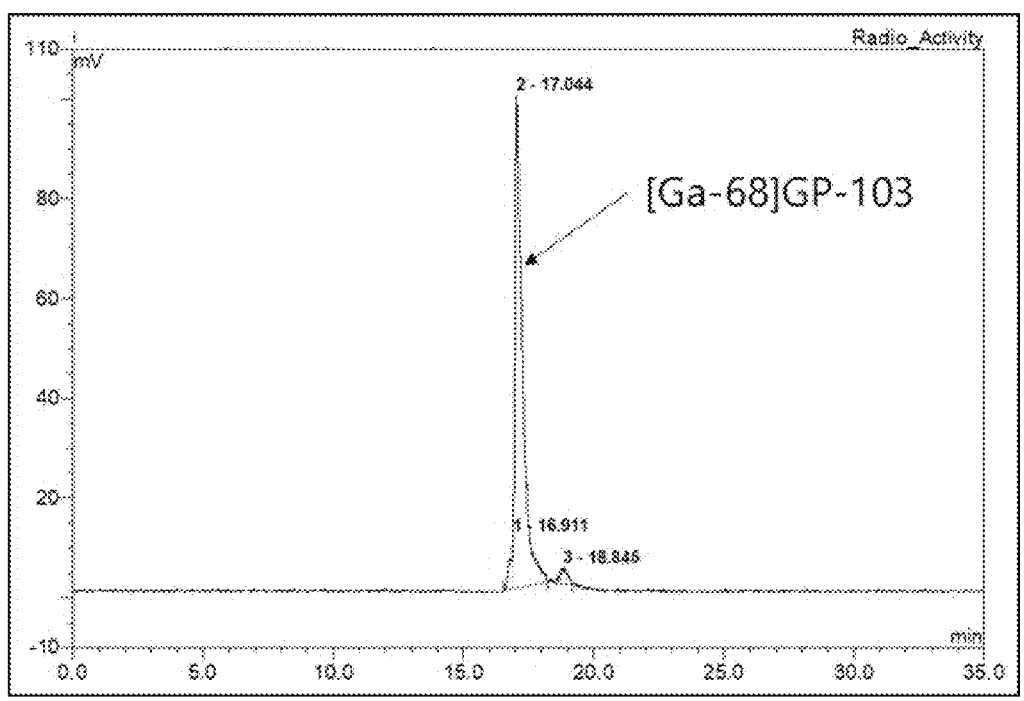
FIG. 5 illustrates the results of purifying [Ga-68]GP-103 labeled with Ga-68 using an acetate buffer with C18 light Sep-Pak.

The results are illustrated in FIG. 5.

Figure 6:
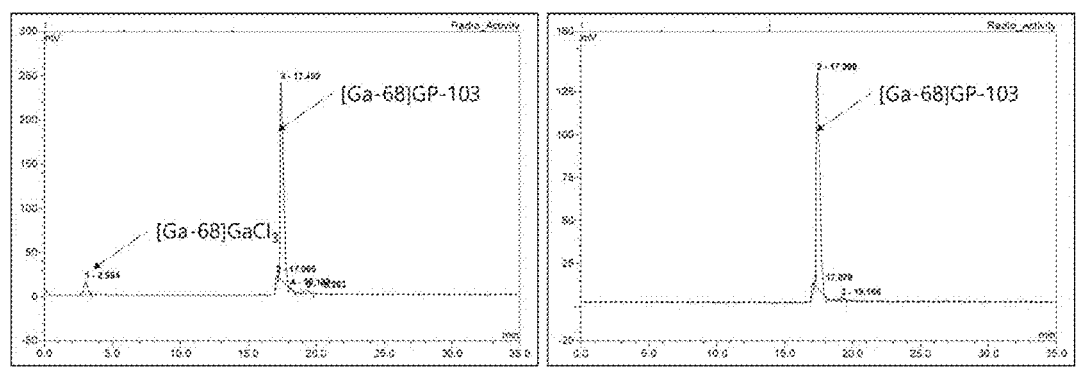
FIG. 6 illustrates the results of confirming [Ga-68]GP-103 labeled with Ga-68 using an acetate buffer kit without any purification.

Example 2-6. Radioisotope Labeling of GP-103 Using Acetate Buffer Kit 2 mL of 0.6 N HCl including 202 MBq Ga-68 was mixed with a 1 M sodium acetate buffer solution in which 0.05 mg of a GP-103 precursor was dissolved, and the resulting mixture was allowed to stand at room temperature for 10 minutes. It was confirmed that the labeling efficiency of the reaction mixture was 93.2% by HPLC, 180 MBq [Ga-68]GP-103 was obtained with a high yield of 96.7%, and the purity confirmed by HPLC in the same manner as in Example 2-1 was 95.7%. The results are illustrated in FIG. 6.

Example 2-7. Preparation of Lyophilized Formulation of $^{99m}$Tc-Labeled GP-104 Using Lyophilized Formulation Including Cysteine 2 mL of Tc-99m was added dropwise to a lyophilized vial including 0.1 mg of GP-104, 15 µg of SnCl$_2$, and 10 µg of cysteine, the vial was allowed to stand at room temperature for 10 minutes, and the reaction was terminated by adjusting pH to 7 using a NaOH solution. Labeling purity was confirmed to be 93.21% by HPLC (analysis conditions: Luna C18 250×4.6 mm, phosphate buffer:acetonitrile (100:0, 0 to 5 minutes; 80:20, 5 to 10 minutes; 80:20, 17 minutes; 100:0, 17.1 minutes). 100:0. 20 min), 1.0 mL/min, UV=280 nm).

Figure 7:
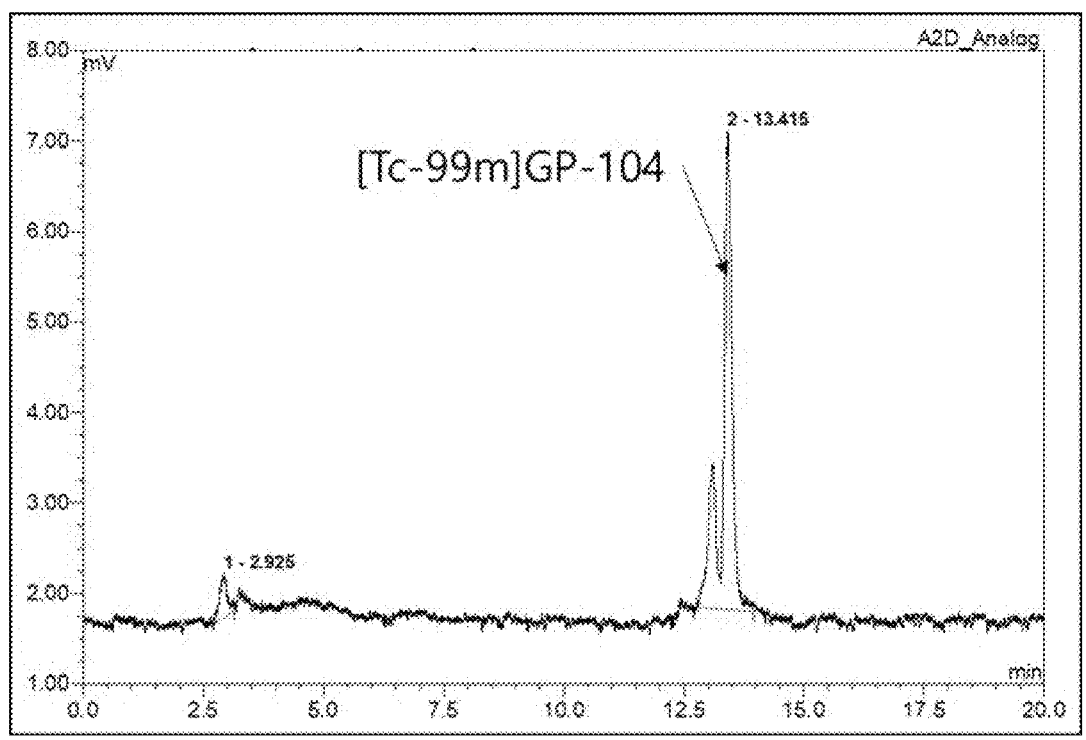
FIG. 7 illustrates the labeling results of [Tc-99m]GP-104 using a lyophilized vial including GP-104, $SnCl_2$, and cysteine.

The results are illustrated in FIG. 7.

Example 2-8. Synthesis of $^{99m}$Tc-Labeled GP-104 Using Lyophilized Formulation Including Cysteine 2 mL of Tc-99m was added dropwise to a lyophilized vial including 0.1 mg of GP-104, 15 µg of SnCl$_2$, and 20 µg (165 nmol) of cysteine, the vial was allowed to stand at room temperature for 10 minutes, and the reaction was terminated by adjusting pH to 7 using a NaOH solution. Labeling purity was confirmed using HPLC in the same manner as in Example 2-7.

Example 2-9. Synthesis of $^{99m}$Tc-Labeled GP-104 Using Lyophilized Formulation Including Cysteine and Vitamin B1

2 mL of Tc-99m was added dropwise to a lyophilized vial including 0.1 mg of GP-104, 15 µg of SnCl$_2$, 10 µg (82.5 nmol) of cysteine and 22 µg (82.5 nmol) of VB1, the vial was allowed to stand at room temperature for 10 minutes, and the reaction was terminated by adjusting pH to 7 using a NaOH solution. Labeling purity was confirmed using HPLC in the same manner as in Example 2-7.

Example 2-10. Synthesis of $^{99m}$Tc-Labeled GP-104 Using Lyophilized Formulation Including Cysteine and Vitamin B6

2 mL of Tc-99m was added dropwise to a lyophilized vial including 0.1 mg of GP-104, 15 µg of SnCl$_2$, 10 µg (82.5 nmol) of cysteine and 17 µg (82.5 nmol) of VB6, the vial was allowed to stand at room temperature for 10 minutes, and the reaction was terminated by adjusting pH to 7 using a NaOH solution. Labeling purity was confirmed using HPLC in the same manner as in Example 2-7.

Example 2-11. Preparation of Lyophilized Formulation of $^{99m}$Tc-Labeled GP-105

2 mL of Tc-99m was added dropwise to a lyophilized vial including 0.1 mg of GP-105 and 15 µg of SnCl$_2$, the vial was allowed to stand at room temperature for 10 minutes, and the reaction was terminated by adjusting pH to 7 using NaOH and 10 µg of cysteine. Labeling purity was confirmed to be 97.46% using HPLC in the same manner as in Example 2-7.

Figure 8:
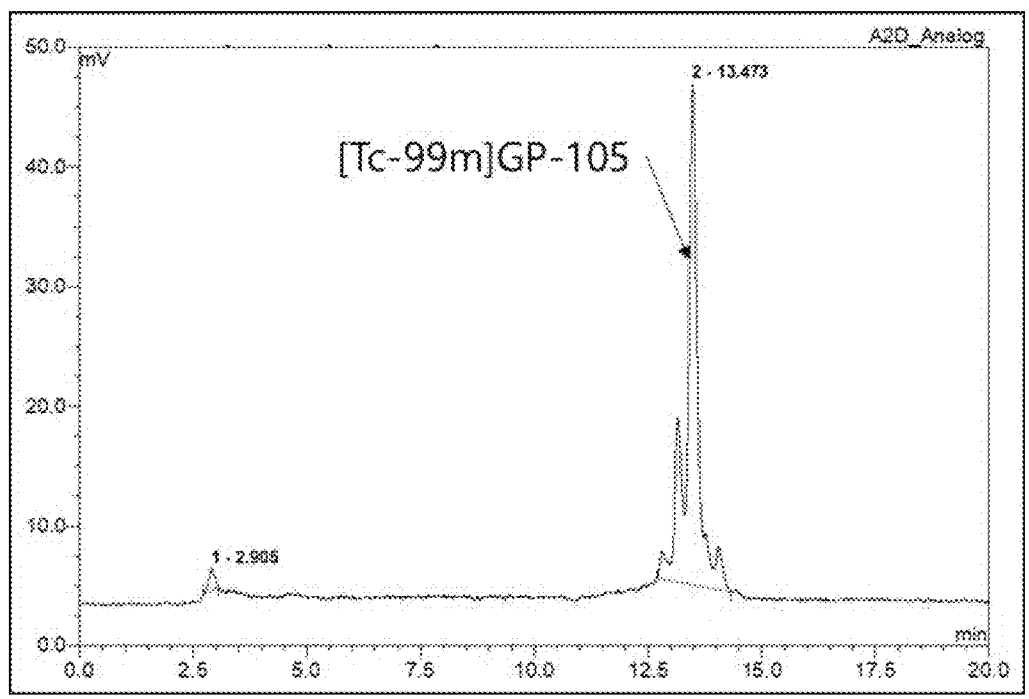
FIG. 8 illustrates the labeling results of [Tc-99m]GP-105 using a lyophilized vial including GP-105 and cysteine.
Figure 9A:
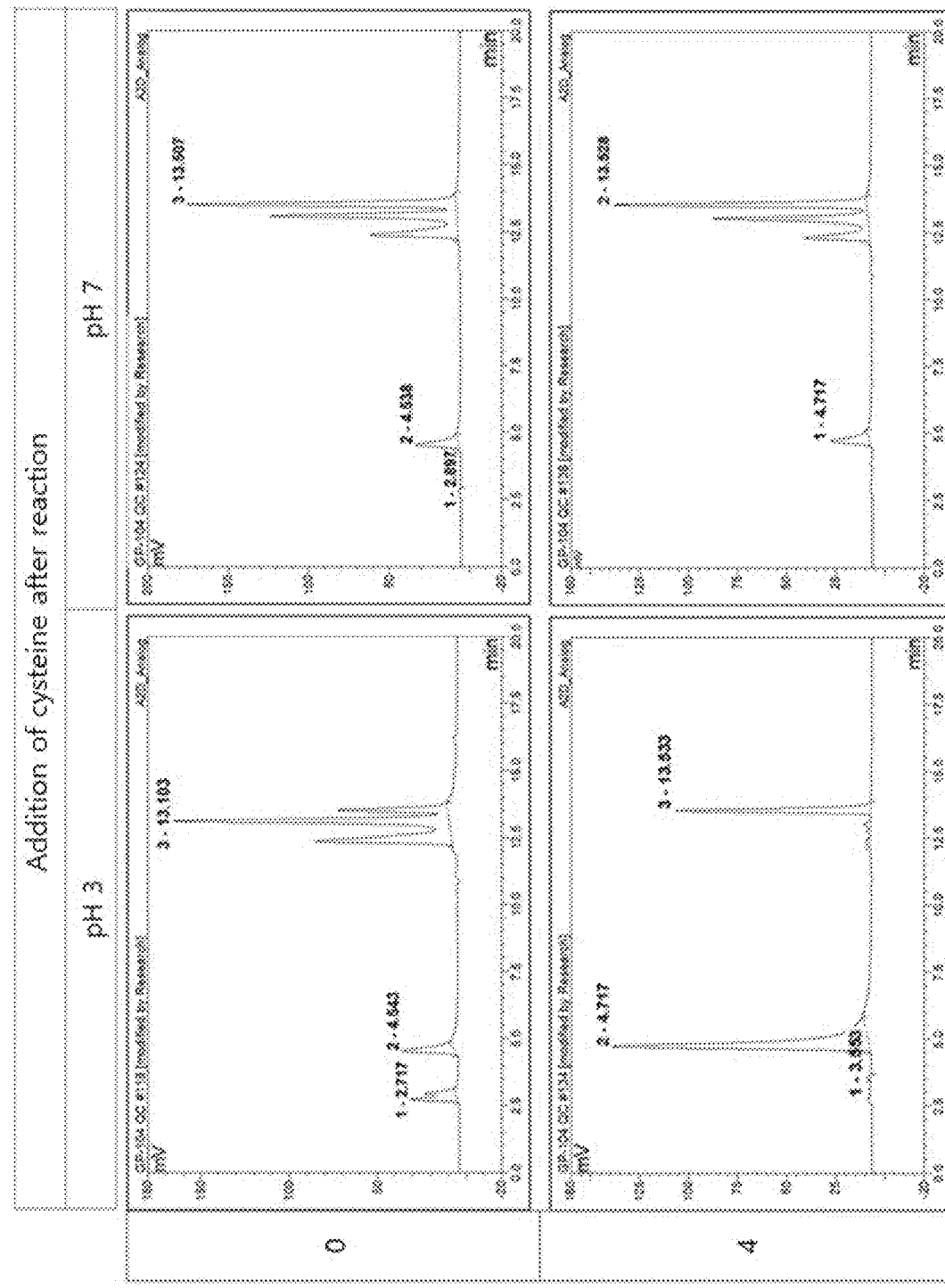
FIG. 9 illustrates the labeling results of [Tc-99m]GP-104 labeled with Tc-99m according to the timing of cysteine addition.
Figure 9B:
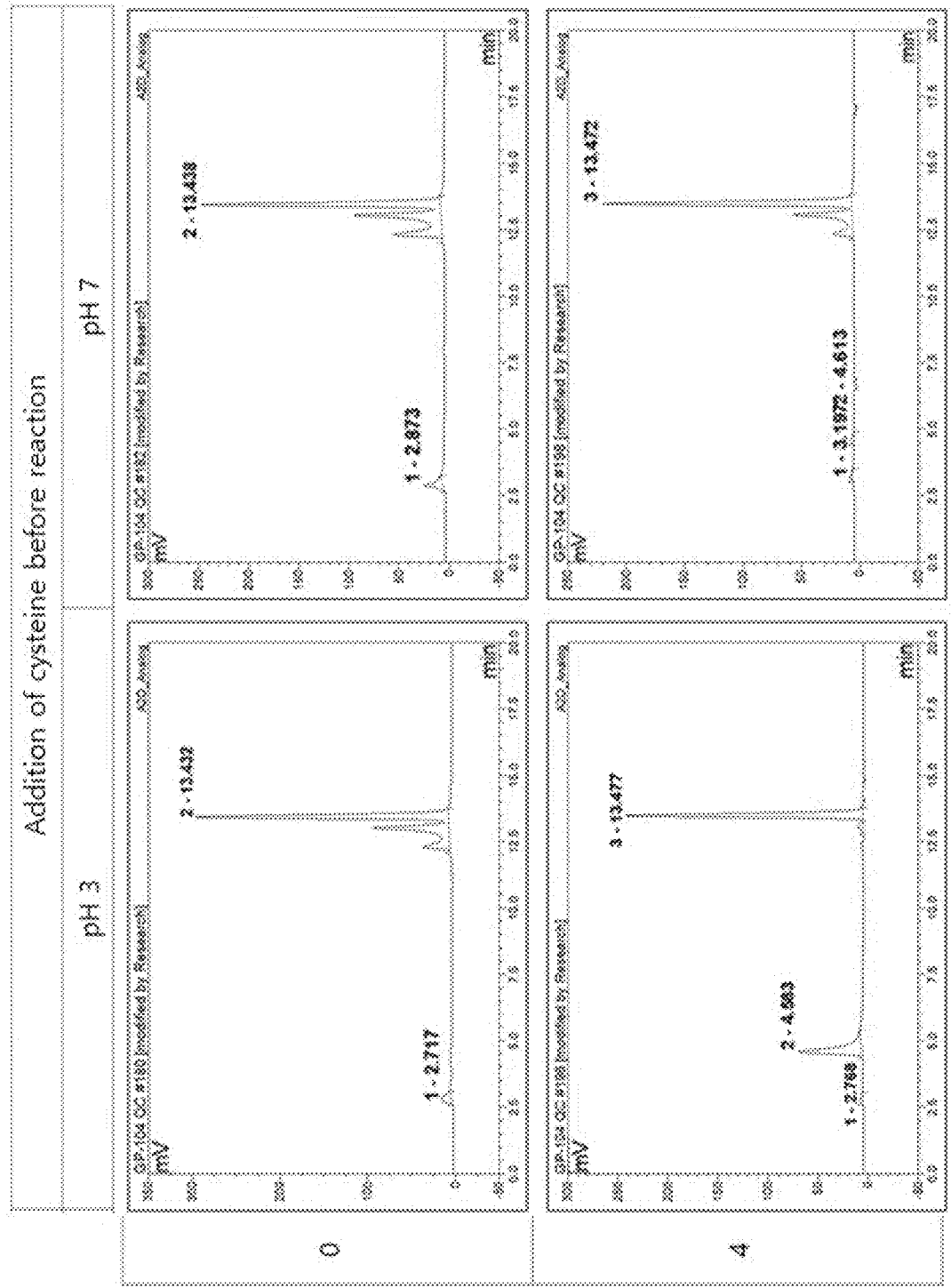
Figure 10:
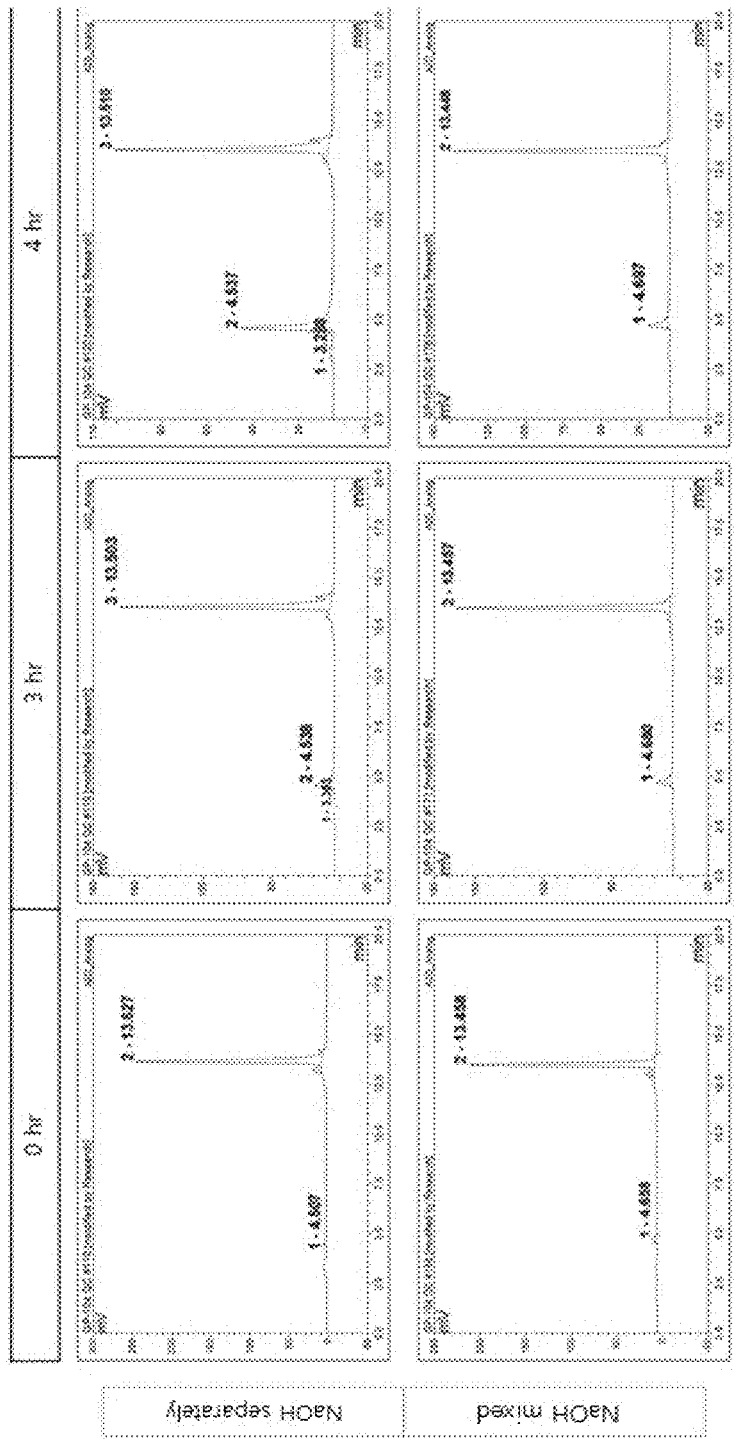
FIG. 10 illustrates the labeling results of [Tc-99m]GP-105 labeled with Tc-99m according to the NaOH addition method.

The results are illustrated in FIG. 8.

Example 2-12. Synthesis of $^{99m}$Tc-Labeled GP-105 Using Lyophilized Formulation Including Cysteine 2 mL of Tc-99m was added dropwise to a lyophilized vial including 0.1 mg of GP-105, 15 µg of SnCl$_2$, and 20 µg (165 nmol) of cysteine, the vial was allowed to stand at room temperature for 10 minutes, and the reaction was terminated by adjusting pH to 7 using a NaOH solution. Labeling purity was confirmed using HPLC in the same manner as in Example 2-7.

Example 2-13. Synthesis of $^{99m}$Tc-Labeled GP-105 Using Lyophilized Formulation Including Cysteine and Vitamin B1

2 mL of Tc-99m was added dropwise to a lyophilized vial including 0.1 mg of GP-105, 15 µg of SnCl$_2$, 10 µg (82.5 nmol) of cysteine and 22 µg (82.5 nmol) of VB1, the vial was allowed to stand at room temperature for 10 minutes, and the reaction was terminated by adjusting pH to 7 using a NaOH solution. Labeling purity was confirmed using HPLC in the same manner as in Example 2-7.

Example 2-14. Synthesis of $^{99m}$Tc-Labeled GP-105 Using Lyophilized Formulation Including Cysteine and Vitamin B6

2 mL of Tc-99m was added dropwise to a lyophilized vial including 0.1 mg of GP-105, 15 µg of SnCl$_2$, 10 µg (82.5 nmol) of cysteine and 17 μg (82.5 nmol) of VB6, the vial was allowed to stand at room temperature for 10 minutes, and the reaction was terminated by adjusting pH to 7 using a NaOH solution. Labeling purity was confirmed using HPLC in the same manner as in Example 2-7.

Example 3. Confirmation of Stability of GP-104

Example 3-1. Confirmation of Stability of GP-104

After 2.0 mg of GP-104 was dissolved in 1.8 mL of water for injection and 0.2 mL of ethanol, the resulting solution was allowed to stand with a pH of about 5 at room temperature for 10 minutes when 20 μL of $SnCl_2$ (15 mg/mL) and 2 mL of Tc-99m were added thereto, and the reaction was terminated by adjusting the pH to 7 using a NaOH solution. Stability up to 4 hours was confirmed by radioTLC under conditions of pH 5 and pH 7, respectively, and the results are summarized in the following Table 1. (TLC analysis conditions: iTLC was used, Eluent A: methyl ethyl ketone 100%, Eluent B: pyridine:acetic acid:purified water=3:5:15, and purity calculation: Eluent A−Eluent B)

As shown in Table 1, it was confirmed that 90% purity was maintained up to 0.5 hours at a pH of 5, and 90% purity was maintained only immediately after the reaction at a pH of 7.

TABLE 1

|  | pH 5 | | | pH 7 | | |
| --- | --- | --- | --- | --- | --- | --- |
|  | Eluent A | Eluent B | Purity | Eluent A | Eluent B | Purity |
| 0 hour | 95.7 | 5.42 | 90.28 | 98.26 | 7.67 | 90.59 |
| 0.5 hours | 95.42 | 4.06 | 91.36 | 92.82 | 14.78 | 78.04 |
| 1.0 hour | 98.43 | 16.15 | 82.28 | 94.51 | 16.2 | 78.31 |
| 1.5 hours | 85.7 | 12.91 | 72.79 | 96.11 | 13.41 | 82.7 |
| 2.0 hours | 91.79 | 21.68 | 70.11 | 96.22 | 19.61 | 76.61 |
| 3.0 hours | 91.64 | 23.93 | 67.71 | 87.58 | 9.65 | 77.93 |
| 4.0 hours | 80.48 | 24.55 | 55.93 | 73.22 | 19.08 | 54.14 |

Example 3-2. Confirmation of Stability of GP-104 Upon Addition of Cysteine

After 2.0 mg of GP-104 was dissolved in 1.8 mL of water for injection and 0.2 mL of ethanol, pH was adjusted to about 5 and the resulting solution was allowed to stand at room temperature for 10 minutes when 20 μL of $SnCl_2$ (15 mg/mL), 20 μL of cysteine (10 mg/mL) and 2 mL of Tc-99m were added thereto, and the reaction was terminated by adjusting the pH to 7 using a NaOH solution. Stability up to 4 hours was confirmed by radioTLC under conditions of pH 5 and pH 7, respectively, and the results are summarized in the following Table 2. (TLC analysis conditions: iTLC was used, Eluent A: methyl ethyl ketone 100%, Eluent B: pyridine:acetic acid:purified water=3:5:15, and purity calculation: Eluent A−Eluent B)

As shown in Table 2, at a pH of 7 upon the addition of cysteine, the purity of [Tc-99m]GP-104 was highly maintained at 90% or more even after 4 hours, so it was confirmed that upon the addition of cysteine, [Tc-99m]GP-104 was maintained in a stable state even after 4 hours only at a pH of 7.

TABLE 2

|  | cysteine, pH 5 | | | cysteine, pH 7 | | |
| --- | --- | --- | --- | --- | --- | --- |
|  | Eluent A | Eluent B | Purity | Eluent A | Eluent B | Purity |
| 0 hour | 89.51 | 3.54 | 85.97 | 100 | 3.06 | 96.94 |
| 0.5 hours | 93.51 | 5.62 | 87.89 | 98.3 | 4.94 | 93.36 |
| 1.0 hour | 93.61 | 3.22 | 90.39 | 98.27 | 1.92 | 96.35 |
| 1.5 hours | 95.55 | 2.08 | 93.47 | 100 | 2.31 | 97.69 |
| 2.0 hours | 91.17 | 8.2 | 82.97 | 100 | 2.88 | 97.12 |
| 3.0 hours | 89.61 | 3.55 | 86.06 | 100 | 5.86 | 94.14 |
| 4.0 hours | 91.99 | 4.43 | 87.56 | 100 | 4.24 | 95.76 |

Example 3-3. Confirmation of Stability of 0.1 mg of GP-104 According to Timing of Cysteine Treatment In order to confirm the effect of cysteine addition after the reaction, the following experiment was performed: 0.1 mg of GP-104 was dissolved in water for injection, the pH was adjusted to about 3.5 when 10 μL of $SnCl_2$ (1.5 mg/mL) and 2 mL of Tc-99m were added thereto, and the resulting mixture was allowed to stand at room temperature for 10 minutes. The reaction was terminated by adjusting the pH to 7 using a NaOH solution and 10 μL of cysteine (1.0 mg/mL). Labeling purity was confirmed to be 91.4% using HPLC in the same manner as in Example 2-7.

In order to confirm the effect of cysteine addition before the reaction, the following experiment was performed:

After 0.1 mg of GP-104 was dissolved in water for injection, pH was adjusted to about 3.5 and the resulting solution was allowed to stand at room temperature for 10 minutes when 10 μL of $SnCl_2$ (1.5 mg/mL), 10 μL of cysteine (1.0 mg/mL) and 2 mL of Tc-99m were added thereto, and the reaction was terminated by adjusting the pH to 7 using a NaOH solution. Labeling purity was confirmed to be 94.84% using HPLC in the same manner as in Example 2-7.

The results are shown in Table 3 and FIG. 7.

As shown in Table 3, at a pH of 7 regardless of the timing of cysteine addition, the purity of [Tc-99m]GP-104 was highly maintained at 90% or more even after 4 hours, so it was confirmed that [Tc-99m]GP-104 was maintained in a stable state simply by adding cysteine when the pH was adjusted.

TABLE 3

|  | Addition of cysteine after reaction | | Addition of cysteine before reaction | |
| --- | --- | --- | --- | --- |
|  | pH 3 | pH 7 | pH 3 | pH 7 |
| 0 hour | 82.63 | 91.4 | 95.6 | 94.84 |
| 1 hour | 70.01 | 91.42 | 92.7 | 94.43 |
| 2 hours | 52.58 | 91.1 | 84.17 | 97.66 |
| 3 hours | 42.46 | 90.3 | 76.77 | 98.53 |
| 4 hours | 30.38 | 90.19 | 69.34 | 97.75 |

Example 3-4. Confirmation of Stability of $^{99m}$Tc-Labeled GP-104 Under Acidic and Basic Conditions HCl and NaOH was additionally added dropwise to the solution of Example 2-8 to perform a stability evaluation by adjusting the final pH of the solution to acidic (pH 5.5) and basic (pH 8.5) conditions, and labeling purity was confirmed using HPLC in the same manner as in Example 2-7.

As shown in Table 4, it was confirmed that a stable state was maintained only at neutrality with cysteine by confirming that [Tc-99m]GP-104 exhibited a purity of 90% or more only under neutral conditions among acidic, basic and neutral conditions in a solution including 165 nmol cysteine even after 4 hours, the purity was reduced to 90% or less after 2 hours under acidic conditions, and the purity of 90% could not be maintained even until 2 hours particularly under basic conditions.

TABLE 4

|  | pH 5.5 | pH 7 | pH 8.5 |
|---|---|---|---|
| 0 hr | 95.26 | 95.26 | 95.26 |
| 2 hr | 91.45 | 91.19 | 79.83 |
| 4 hr | 89.28 | 91.61 | 51.77 |

Example 3-5. Evaluation Stability of $^{99m}$Tc-Labeled GP-104 Under Acidic and Basic Conditions HCl and NaOH was additionally added dropwise to the solution of Example 2-9 to perform a stability evaluation by adjusting the final pH of the solution to acidic (pH 5.5) and basic (pH 8.5) conditions, and labeling purity was confirmed using HPLC in the same manner as in Example 2-7.

As shown in Table 5, it was confirmed that a solution including cysteine corresponding to half the moles of cysteine of Example 2-8 and VB1 of the same moles, could maintain a radiochemical purity of 98% or more until 4 hours at a pH of 7, exhibited a radiochemical purity of 90% or more until 4 hours even under acidic conditions, and exhibited a radiochemical purity of 80% or more until 4 hours even under basic conditions, so it was confirmed that [Tc-99m] GP-104 was more stable under the conditions including cysteine and VB1.

TABLE 5

|  | pH 5.5 | pH 7 | pH 8.5 |
|---|---|---|---|
| 0 hr | 100 | 100 | 100 |
| 2 hr | 92.72 | 98.63 | 83.08 |
| 4 hr | 91.20 | 98.18 | 80.97 |

Example 3-6. Evaluation Stability of $^{99m}$Tc-Labeled GP-104 Under Acidic and Basic Conditions HCl and NaOH was additionally added dropwise to the solution of Example 2-10 to perform a stability evaluation by adjusting the final pH of the solution to acidic (pH 5.5) and basic (pH 8.5) conditions, and labeling purity was confirmed using HPLC in the same manner as in Example 2-7.

TABLE 6

|  | pH 5.5 | pH 7 | pH 8.5 |
|---|---|---|---|
| 0 hr | 97.24 | 97.24 | 97.24 |
| 2 hr | 90.29 | 95.61 | 95.61 |
| 4 hr | 90.65 | 96.25 | 91.19 |

As shown in Table 6, it was confirmed that a solution including cysteine corresponding to half the moles of cysteine of Example 2-8 and VB6 of the same moles, could maintain a radiochemical purity of 96% or more, which is the highest purity, until 4 hours at a pH of 7, and exhibited a radiochemical purity of 90% or more until 4 hours even under acidic and basic conditions.

Example 4: Confirmation of Stability of GP-105

Example 4-1. Confirmation of Stability of GP-105

After 2.0 mg of GP-105 was dissolved in 1.8 mL of water for injection and 0.2 mL of ethanol, the pH was adjusted to about 5 and the resulting solution was allowed to stand at room temperature for 10 minutes when 20 μL of SnCl$_2$ (15 mg/mL) and 2 mL of Tc-99m were added thereto, and the reaction was terminated by adjusting the pH to 7 using a NaOH solution. Stability until 4 hours under conditions of pH 5 and pH 7 was each confirmed by radioTLC. (TLC analysis conditions: iTLC was used, Eluent A: methyl ethyl ketone 100%, Eluent B: pyridine:acetic acid:purified water=3:5:15, and purity calculation: Eluent A−Eluent B)

As shown in Table 7, it was confirmed that the maximum purity of [Tc-99m]GP-105 was 82.93% at pH 5 and pH 7 and the purity decreased over time.

TABLE 7

|  | pH 5 | | | pH 7 | | |
|---|---|---|---|---|---|---|
|  | Eluent A | Eluent B | Purity | Eluent A | Eluent B | Purity |
| 0 hour | 100 | 17.07 | 82.93 | 100 | 17.07 | 82.93 |
| 0.5 hours | 95.67 | 23.14 | 72.53 | 90.76 | 25.13 | 65.63 |
| 1.0 hour | 97.07 | 23.94 | 73.13 | 85.38 | 25.01 | 60.37 |
| 1.5 hours | 94.54 | 23.31 | 71.23 | 95.97 | 37.24 | 58.73 |
| 2.0 hours | 93.25 | 32.44 | 60.81 | 96.17 | 41.87 | 54.3 |
| 3.0 hours | 80.67 | 19.68 | 60.99 | 94 | 39.88 | 54.12 |
| 4.0 hours | 82.64 | 25.53 | 57.11 | 85.5 | 45.33 | 40.17 |

Example 4-2. Confirmation of Stability of 2 mg of GP-105 Upon Addition of Cysteine After 2.0 mg of GP-105 was dissolved in 1.8 mL of water for injection and 0.2 mL of ethanol, pH was adjusted to about 5 and the resulting solution was allowed to stand at room temperature for 10 minutes when 20 μL of SnCl$_2$ (15 mg/mL), 20 μL of cysteine (10 mg/mL) and 2 mL of Tc-99m were added thereto, and the reaction was terminated by adjusting the pH to 7 using a NaOH solution. Stability until 4 hours under conditions of pH 5 and pH 7 was each confirmed by radioTLC. (TLC analysis conditions: iTLC was used, Eluent A: methyl ethyl ketone 100%, Eluent B: pyridine:acetic acid:purified water=3:5:15, and purity calculation: Eluent A−Eluent B)

As shown in Table 8, it was confirmed that upon the addition of cysteine, the purity of [Tc-99m]GP-105 was maintained at 70% or more at a pH of 5, and the purity was maintained at 90% or more particularly at a pH of 7, indicating that the purity was more stable due to the addition of cysteine.

TABLE 8

|  | cysteine, pH 5 | | | cysteine, pH 7 | | |
|---|---|---|---|---|---|---|
|  | Eluent A | Eluent B | Purity | Eluent A | Eluent B | Purity |
| 0 hour | 100 | 17.07 | 82.93 | 100 | 9.62 | 90.38 |
| 0.5 hours | 100 | 7.63 | 92.37 | 98.65 | 6.37 | 92.28 |

TABLE 8-continued

|  | cysteine, pH 5 | | | cysteine, pH 7 | | |
| --- | --- | --- | --- | --- | --- | --- |
|  | Eluent A | Eluent B | Purity | Eluent A | Eluent B | Purity |
| 1.0 hour | 89.07 | 12.82 | 76.25 | 98.4 | 13.21 | 85.19 |
| 1.5 hours | 100 | 12.26 | 87.74 | 97.22 | 5.59 | 91.63 |
| 2.0 hours | 57.3 | 18.66 | 38.64 | 95.62 | 6.23 | 89.39 |
| 3.0 hours | 97.4 | 19.8 | 77.6 | 100 | 9.91 | 90.09 |
| 4.0 hours | 98.31 | 21.8 | 76.51 | 100 | 3.21 | 96.79 |

Example 4-3. Confirmation of Stability of 0.1 mg of GP-105 According to NaOH Treatment Method 0.1 mg of GP-105 was dissolved in water for injection, the pH was adjusted to about 3.5 when 10 μL of $SnCl_2$ (1.5 mg/mL) and 2 mL of Tc-99m were added thereto, and the resulting mixture was allowed to stand at room temperature for 10 minutes. The reaction was terminated by adjusting the pH to 7 using a NaOH solution and 10 μL of cysteine (1.0 mg/mL). Labeling purity was confirmed to be 98.1% using HPLC in the same manner as in Example 2-7.

As shown in Table 9, it was confirmed that when cysteine was added after the reaction, the radiochemical purity of [Tc-99m]GP-105 was improved when NaOH was mixed with cysteine and the resulting mixture was added compared to when NaOH was separately added.

TABLE 9

|  | Addition of cysteine after reaction | |
| --- | --- | --- |
|  | NaOH separately | NaOH mixed |
| 0 hour | 99.39 | 98.06 |
| 1 hour | 99.04 | 95.17 |
| 2 hours | 97.02 | 94.14 |
| 3 hours | 91.14 | 91.91 |
| 4 hours | 66.87 | 89.00 |

Example 4-4. Evaluation of Stability of $^{99m}$Tc-Labeled GP-105 Under Acidic and Basic Conditions HCl and NaOH was additionally added dropwise to the solution of Example 2-12 to perform a stability evaluation by adjusting the final pH of the solution to acidic (pH 5.5) and basic (pH 8.5) conditions, and labeling purity was confirmed using HPLC in the same manner as in Example 2-7.

As shown in Table 10, it was confirmed that a solution including 165 nmol cysteine could maintain a radiochemical purity of 90% or more until 2 hours at a pH of 7, and exhibited a radiochemical purity of 80% or more until 4 hours even under acidic conditions.

TABLE 10

|  | pH 5.5 | pH 7 | pH 8.5 |
| --- | --- | --- | --- |
| 0 hr | 100 | 100 | 100 |
| 2 hr | 85.49 | 94.88 | 50.64 |
| 4 hr | 82.11 | 85.55 | 23.98 |

Example 4-5. Evaluation of Stability of $^{99m}$Tc-Labeled GP-105 Under Acidic and Basic Conditions HCl and NaOH was additionally added dropwise to the solution of Example 2-13 to perform a stability evaluation by adjusting the final pH of the solution to acidic (pH 5.5) and basic (pH 8.5) conditions, and labeling purity was confirmed using HPLC in the same manner as in Example 2-7.

As shown in Table 11, it was confirmed that a solution including cysteine corresponding to half the moles of cysteine of Example 2-12 and VB1 of the same moles, could maintain a radiochemical purity of 94% or more until 4 hours at a pH of 7, exhibited a radiochemical purity of 98% or more until 4 hours even under acidic conditions, and exhibited a radiochemical purity of 90% or more until 4 hours even under basic conditions, so it was confirmed that GP-105 was more stable under the conditions including cysteine and VB1.

TABLE 11

|  | pH 5.5 | pH 7 | pH 8.5 |
| --- | --- | --- | --- |
| 0 hr | 100 | 100 | 100 |
| 2 hr | 100 | 100 | 94.13 |
| 4 hr | 98.63 | 94.88 | 90.17 |

Example 4-6. Evaluation Stability of $^{99m}$Tc-Labeled GP-104 Under Acidic and Basic Conditions HCl and NaOH was additionally added dropwise to the solution of Example 2-14 to perform a stability evaluation by adjusting the final pH of the solution to acidic (pH 5.5) and basic (pH 8.5) conditions, and labeling purity was confirmed using HPLC in the same manner as in Example 2-7.

As shown in Table 12, a solution including cysteine corresponding to half the moles of cysteine of Example 2-12 and VB6 of the same moles, could maintain a radiochemical purity of 98% or more, which is a high purity, until 4 hours at a pH of 7, maintained a purity of 95% or more until 4 hours even under acidic conditions, and exhibited a radiochemical purity of about 90% or more until 4 hours even under basic conditions.

TABLE 12

|  | pH 5.5 | pH 7 | pH 8.5 |
| --- | --- | --- | --- |
| 0 hr | 100 | 100 | 100 |
| 2 hr | 97.24 | 98.56 | 92.21 |
| 4 hr | 95.61 | 98.2 | 89.62 |

Example 5. Confirmation of Contrast Effect

Example 5-1. Production of Thrombotic Disease Model

After 6-week-old rats were anesthetized to make a thrombotic disease model, the carotid artery was secured by opening the skin on the carotid artery side. Then, a filter paper soaked with a 5% ferric chloride solution was exposed on the artery, and then washed three times or more with physiological saline, and the incised skin was sutured again to make a model.

Figure 11:
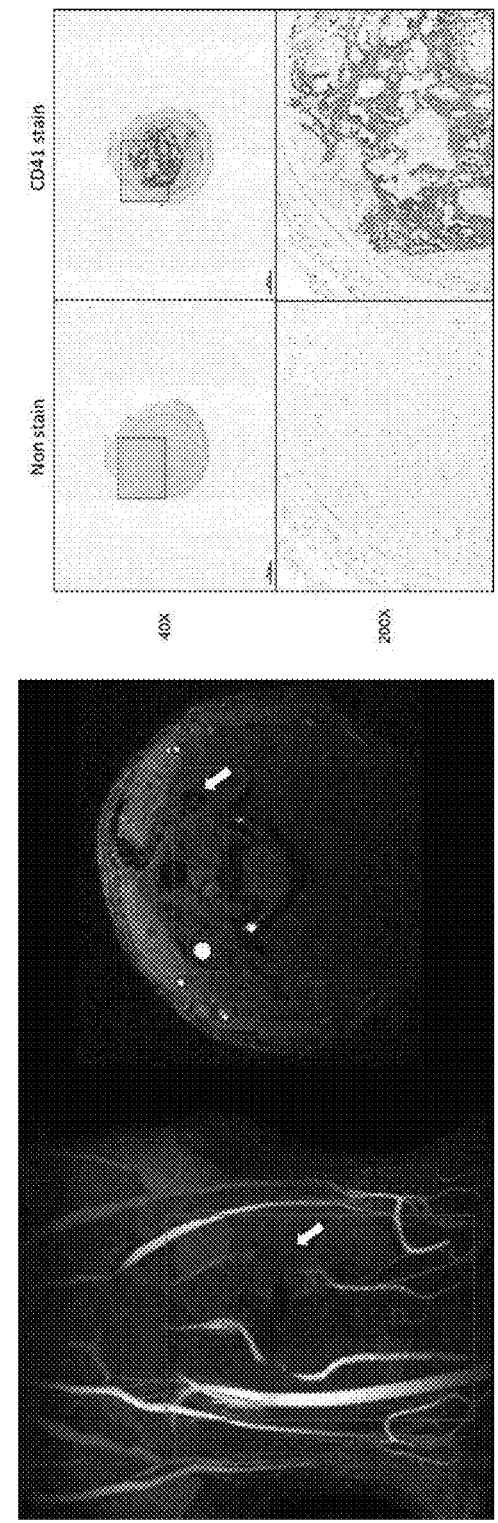
FIG. 11 illustrates MR images (left) and immunohistochemical staining results (right) of the carotid artery of the thrombotic disease model prepared in Example 5-1 of the present invention.

As a result, as illustrated in the left view of FIG. 11, it was confirmed through MR that thrombi were well formed in the right artery, which is a disease site.

In addition, after the PET/SPECT imaging experiment in the constructed rat thrombus model, the corresponding thrombus site and a contralateral healthy blood vessel site were sampled together as a control, the tissues were fixed, and then paraffin blocks were made. After a 4 µm-thick section for tissue immunochemical staining was prepared, the section was subjected to a deparaffinization process, a process of restoring antigenicity using a citrate buffer (pH 9.0), and a process of suppressing the activity of an endogenous active substance with hydrogen peroxide at each step. Thereafter, a CD41 primary antibody (24552-1-AP, Proteintech) was reacted at 4° C. for 12 hours or more, and a secondary antibody (REAL™ EnVision Detection System, DAKO) was reacted at room temperature for 30 minutes or more, followed by color development with DAB (Dako). Stained tissue was confirmed under a Vectra (PerkinElmer) microscope.

As a result, as illustrated in the right view of FIG. 11, it was confirmed under the microscope that glycoprotein IIb/IIIa was overexpressed in the corresponding thrombotic site.

Example 5-2. Evaluation of Glycoprotein IIb/IIIa Specific Uptake in Disease Model of GP-102

It was confirmed through microPET/MR equipment that [Ga-68]GP-102 showed specific uptake in the corresponding disease using a disease model in which a thrombus was formed with glycoprotein IIb/IIIa overexpressed in Example 5-1, and after the model was established, images were acquired on days 1 and 3.

Figure 12:
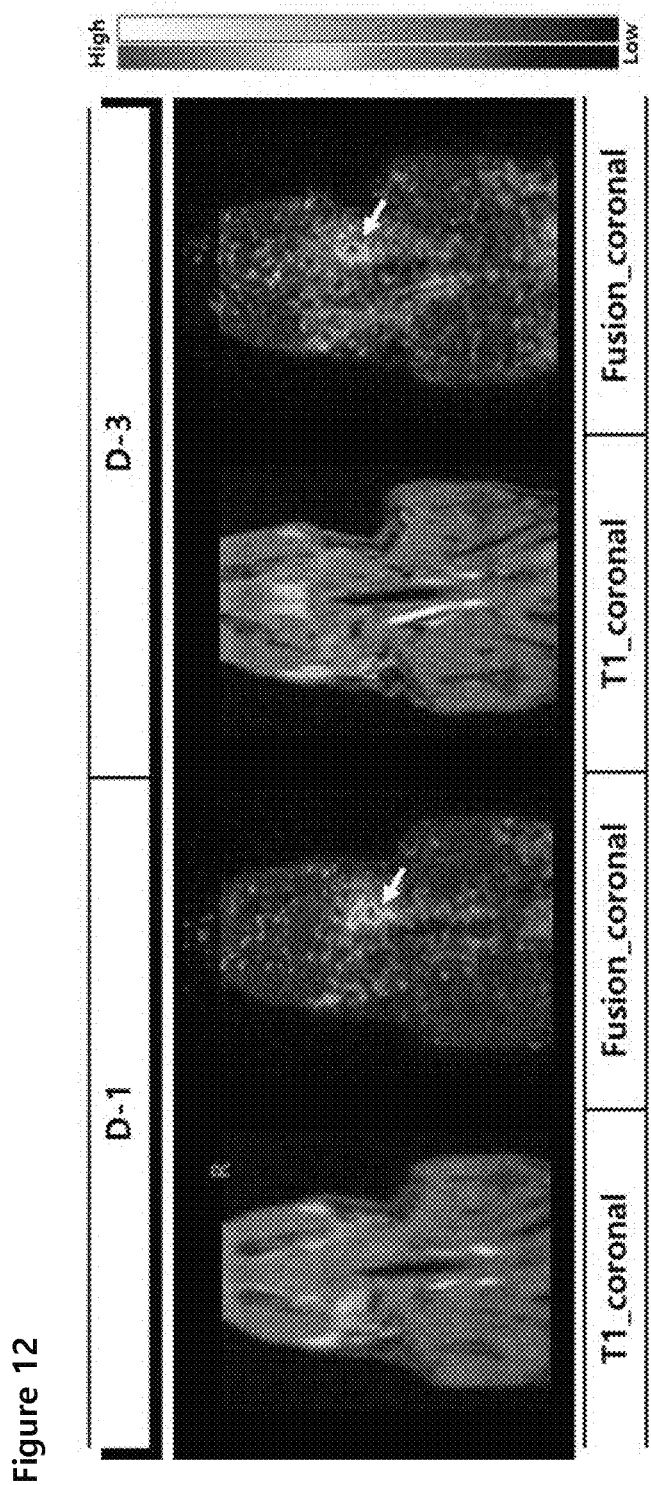
FIG. 12 illustrates the evaluation results of glycoprotein IIB/IIIa-specific uptake of [Ga-68]GP-102 of Example 5-2 of the present invention as images using microPET/MR.

As illustrated in FIG. 12, quantitative analysis revealed that the left and right SUV mean max values on day 1 were 0.7 and 2.1, respectively, with a target to non target ratio of 3.0, and on day 3, the left and right SUVmean max values were 0.6 and 2.0, respectively, with a target to non target ratio of 3.3, and high specific uptake for [Ga-68]GP-102 in the disease model was confirmed.

Example 5-3. Evaluation of Quick Background Radioactivity Excretion in Normal Model of GP-102

The biodistribution and background radioactivity excretion degree of [Ga-68]GP-102 were evaluated using normal mice.

Figure 13:
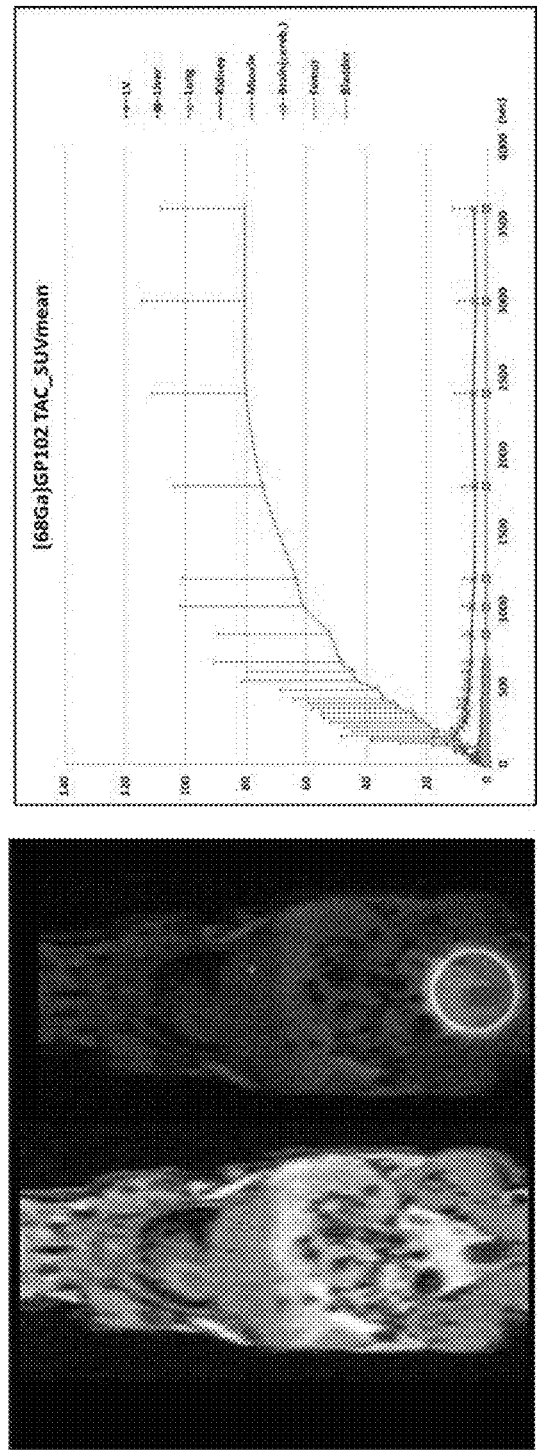
FIG. 13 illustrates a microPET/MR image (left side) and standard uptake value (SUV) levels for each organ over time (sec) to confirm the biodistribution of [Ga-68]GP-102 of Example 5-3 of the present invention.
Figure 14:
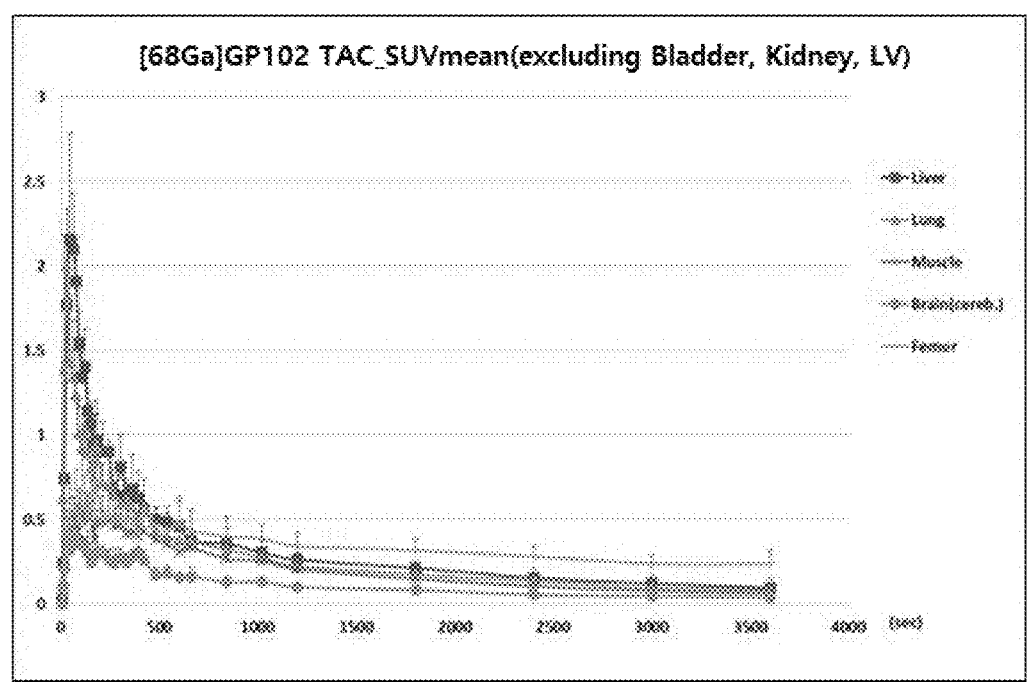
FIG. 14 illustrates the SUV levels of each organ over time except for bladder, kidneys, and left ventricle in FIG. 13 to confirm the biodistribution of [Ga-68]GP-102 of Example 5-3 of the present invention.

As a result, as illustrated in FIGS. 13 and 14, it was confirmed that after intravenous administration, [Ga-68]GP-102 was quickly taken up by major organs in the body and quickly excreted through the renal/urinary excretion pathway.

Therefore, it could be confirmed that active thrombi distributed throughout the body can be visualized using [Ga-68]GP-102.

Example 5-4. Evaluation of Glycoprotein IIb/IIIa Specific Uptake in Disease Model of GP-103

Figure 15:
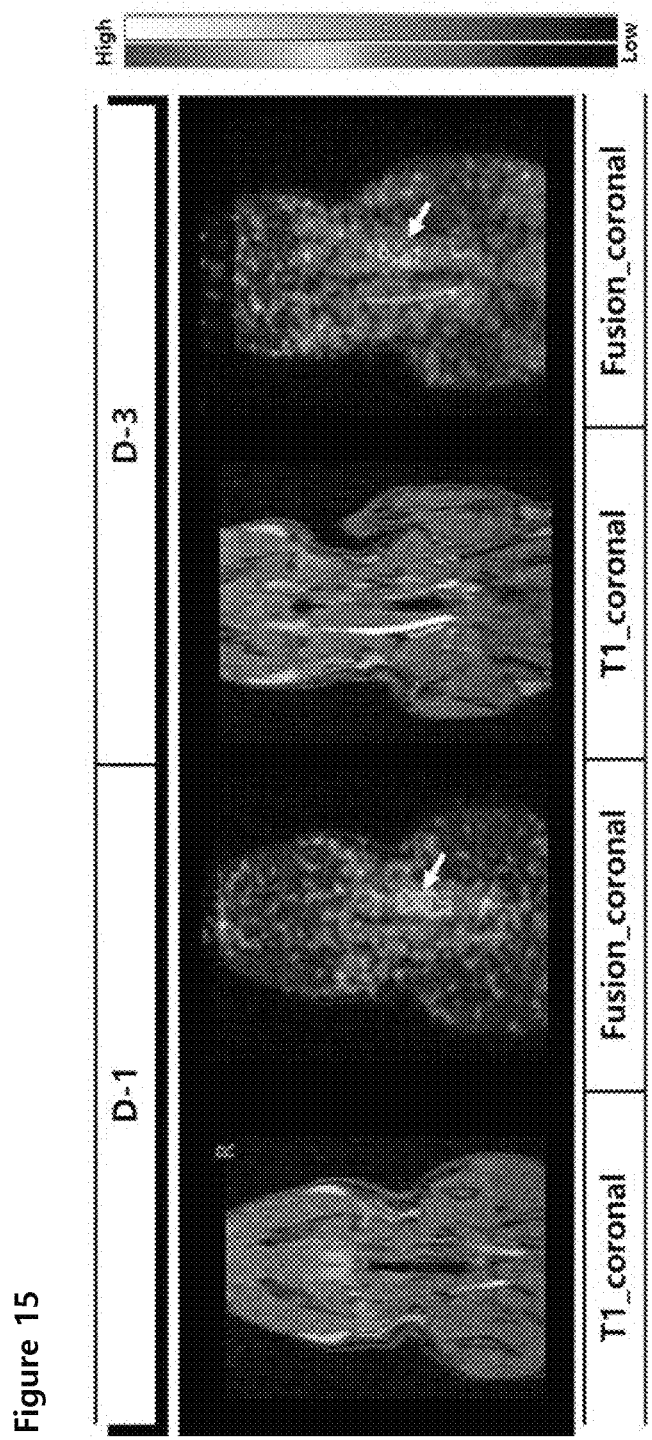
FIG. 15 illustrates the evaluation results of glycoprotein IIB/IIIa-specific uptake of [Ga-68]GP-103 of Example 5-4 of the present invention as images using microPET/MR.

It was confirmed through microPET/MR equipment that [Ga-68]GP-103 showed specific uptake in the corresponding disease using a disease model in which a thrombus was formed with glycoprotein IIb/IIIa overexpressed in Example 5-1, and after the model was established, images acquired on days 1 and 3 are illustrated in FIG. 15.

As illustrated in FIG. 15, quantitative analysis revealed that the SUVmean max values of the left and right arteries on day 1 were 0.8 and 2.1, respectively, with a target to non target ratio of 2.6, and on day 3, the SUVmean max values of the left and right arteries were 0.6 and 1.9, respectively, with a target to non target ratio of 3.1, and high specific uptake for [Ga-68]GP-103 in the disease model was confirmed.

Example 5-5. Evaluation of Quick Background Radioactivity Excretion in Normal Model of GP-103

The biodistribution and background radioactivity excretion degree of [Ga-68]GP-103 were evaluated using normal mice.

Figure 16:
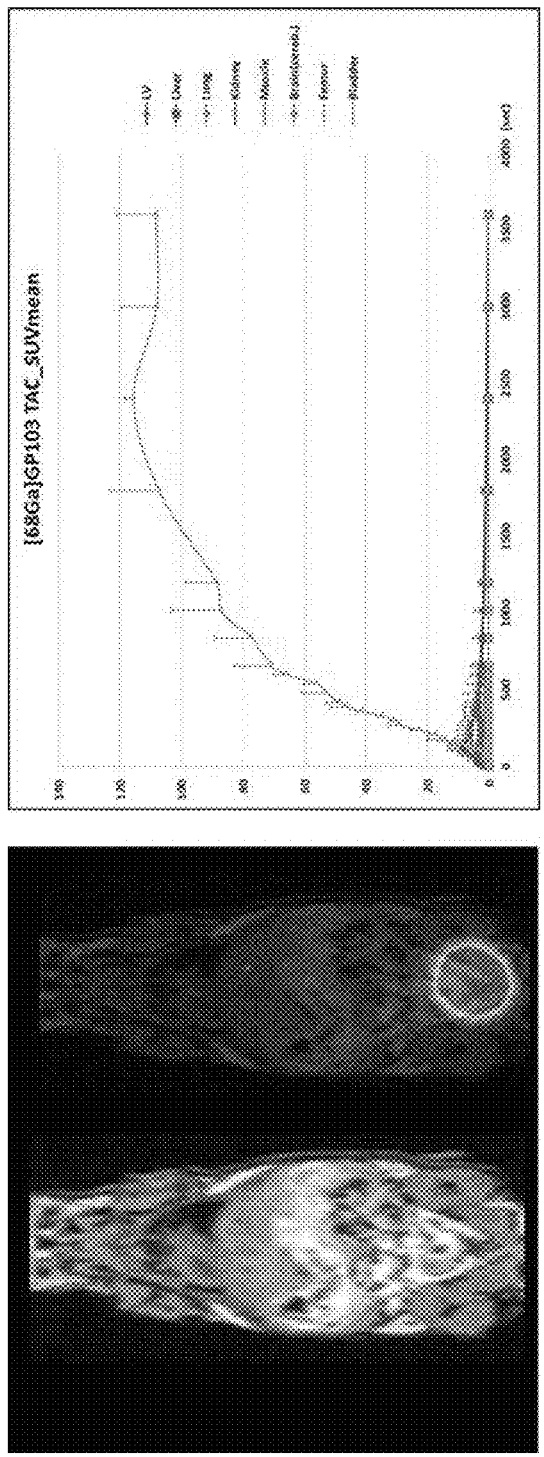
FIG. 16 illustrates a microPET/MR image (left side) and standard uptake value (SUV) levels for each organ over time (sec) to confirm the biodistribution of [Ga-68]GP-103 of Example 5-5 of the present invention.
Figure 17:
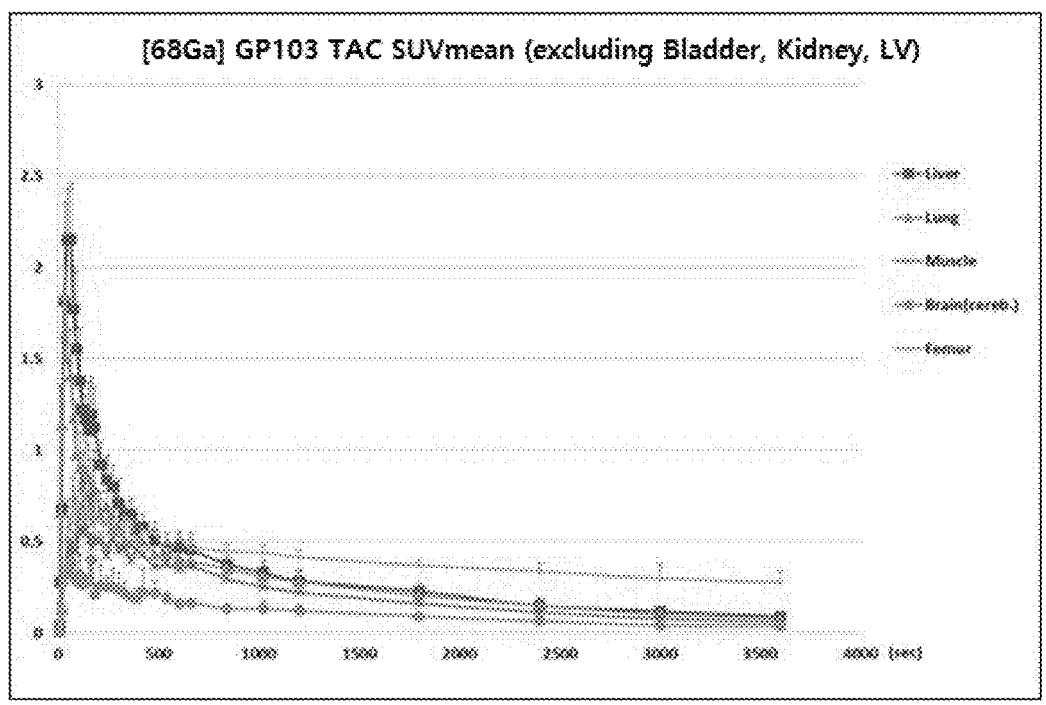
FIG. 17 illustrates the SUV levels of each organ over time except for bladder, kidneys, and left ventricle in FIG. 13 to confirm the biodistribution of [Ga-68]GP-103 of Example 5-5 of the present invention.

As a result, as illustrated in FIGS. 16 and 17, it was confirmed that after intravenous administration, [Ga-68]GP-103 was quickly taken up and removed by major organs in the body and quickly excreted through the renal/urinary excretion pathway.

Therefore, it could be confirmed that active thrombi distributed throughout the body can be visualized using [Ga-68]GP-103.

Example 5-6. Evaluation of Glycoprotein IIb/IIIa Specific Uptake in Disease Model of GP-104

[Tc-99m]GP-104 showed specific uptake for the corresponding disease using a disease model in which a thrombus was formed with glycoprotein IIb/IIIa overexpressed in Example 5-1, and radioactivity values were measured as a gamma counter value by sacrificing rats at the 2nd hour. The value was confirmed at an interval of 1 hour until 4 hours through the microSPECT equipment.

Figure 18:
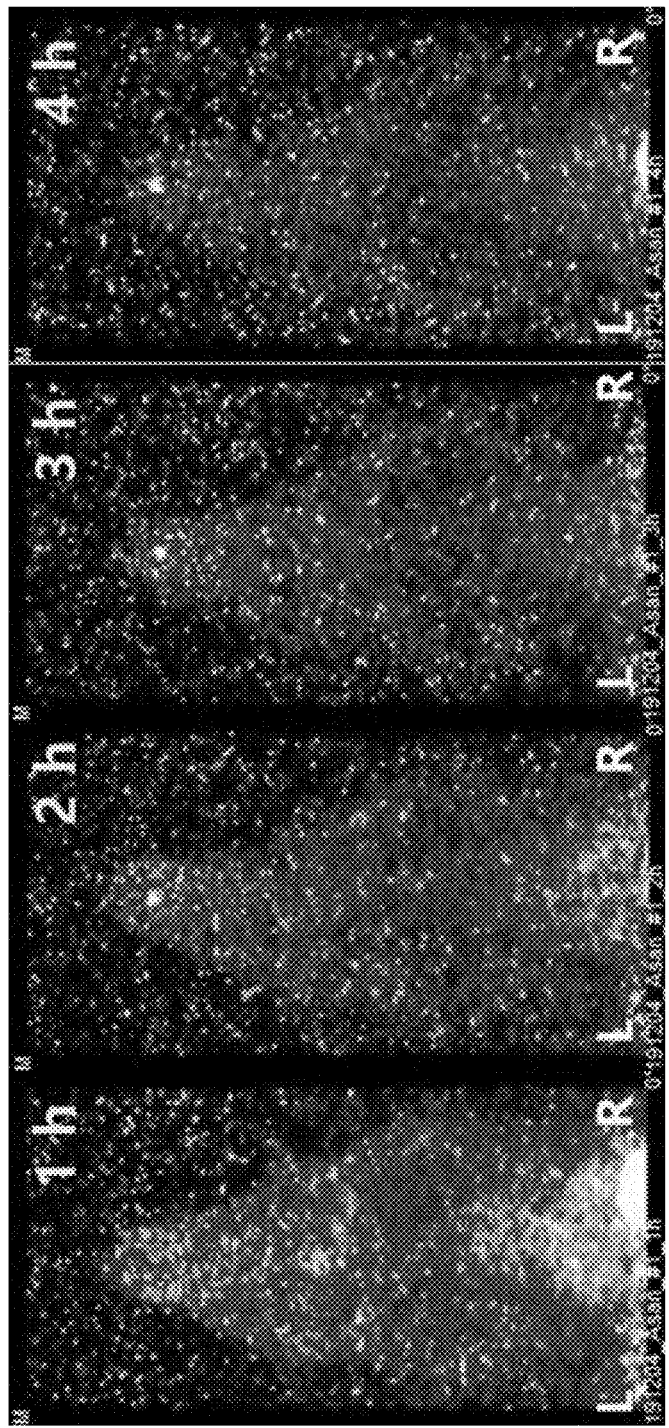
FIG. 18 illustrates the evaluation results of glycoprotein IIB/IIIa-specific uptake of [Tc-99m]GP-104 of Example 5-6 of the present invention as images using microSPECT.

As illustrated in FIG. 18, the counts per minute (CPM)/g values of the left and right arteries were 1.3 and 2.5, respectively, and the target to non target ratio was shown to be 2.0, confirming the high specific uptake of [Tc-99m]GP-104, and therefore, it could be confirmed that [Tc-99m]GP-104 showed a quick background radioactivity excretion effect.

Example 5-7. Evaluation of Glycoprotein IIb/IIIa Specific Uptake in Disease Model of GP-105

[Tc-99m]GP-105 showed specific uptake for the corresponding disease using a disease model in which a thrombus was formed with glycoprotein IIb/IIIa overexpressed in Example 5-1, and radioactivity values were measured as a gamma counter value by sacrificing rats at the 2nd hour. The value was confirmed at an interval of 1 hour until 4 hours through the microSPECT equipment.

Figure 19:
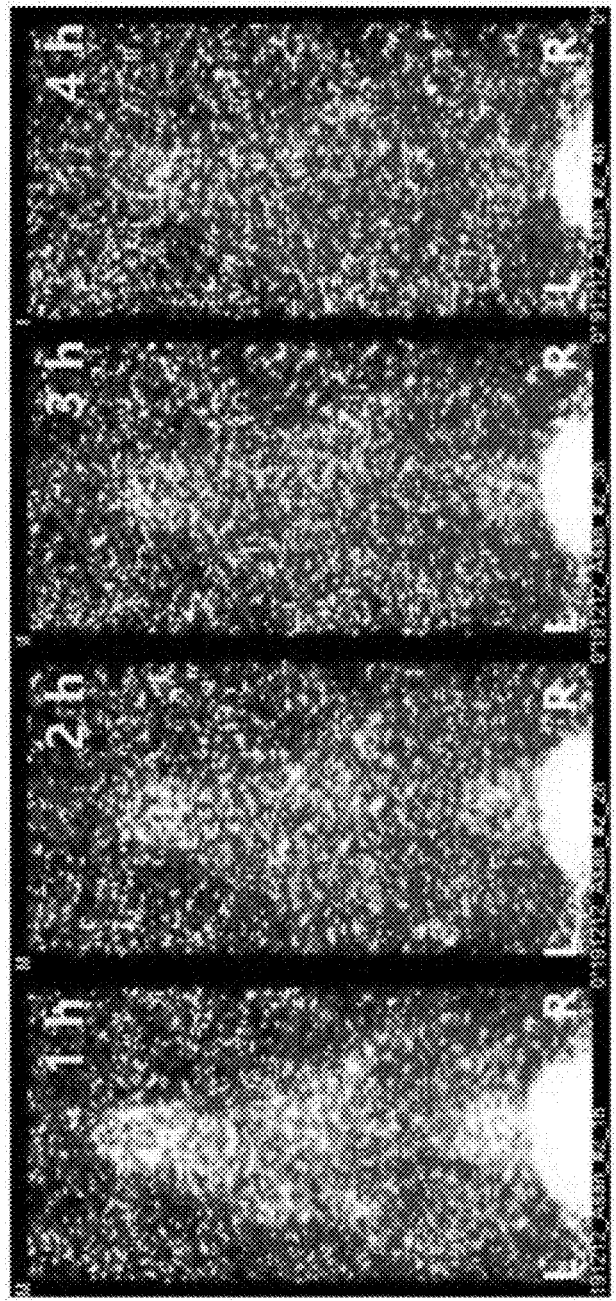
FIG. 19 illustrates the evaluation results of glycoprotein IIB/IIIa-specific uptake of [Tc-99m]GP-105 of Example 5-7 of the present invention as images using microSPECT.

As a result, as illustrated in FIG. 19, the counts per minute (CPM)/g values of the left and right arteries were 23.5 and 63.9, respectively, and the target to non target ratio was shown to be 2.7, confirming the high specific uptake of [Tc-99m]GP-105, and therefore, it could be confirmed that [Tc-99m]GP-105 showed a quick background radioactivity excretion effect.

The above-described description of the present invention is provided for illustrative purposes, and those skilled in the art to which the present invention pertains will understand that the present invention can be easily modified into other specific forms without changing the technical spirit or essential features of the present invention. Therefore, it should be understood that the above-described Examples are illustrative only in all aspects and are not restrictive.

INDUSTRIAL APPLICABILITY

The radiopharmaceutical of the present invention binds to glycoprotein IIb/IIIa with high affinity as a radiotracer labeled with a metallic isotope, and can image thrombi in a non-invasive imaging method through PET or SPECT imaging techniques due to its property of quick reduction of background radioactivity.

Further, the radiopharmaceutical of the present invention can be applied to emergency patients, which has been a challenge for conventional radiopharmaceuticals, through a convenient and quick labeling and non-purification method, and can be directly manufactured or used by manufacturing in most domestic and foreign hospitals that do not have F-18 radiopharmaceutical manufacturing facilities.

Therefore, the radiopharmaceutical of the present invention can be applied easily and simply to the characteristics of thrombotic diseases, which are common in emergency patients, and thus can secure the convenience of examinations and improve the medical welfare of patients, so it has industrial applicability.

The invention claimed is:

1. A compound of formula (1) or a pharmaceutically acceptable salt thereof:

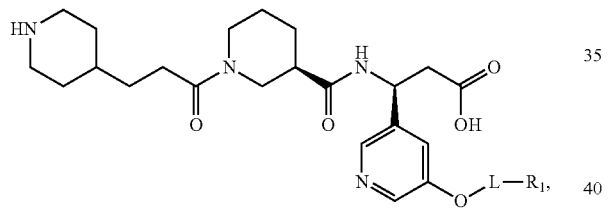

(1)

wherein, in formula (1),
$R_1$ is

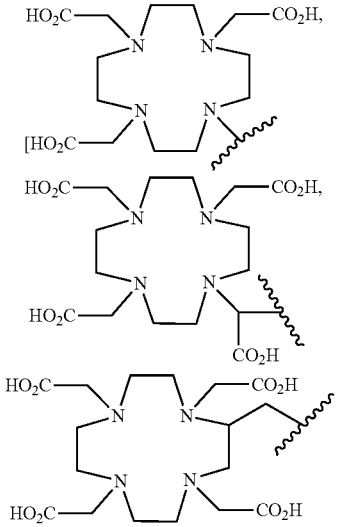

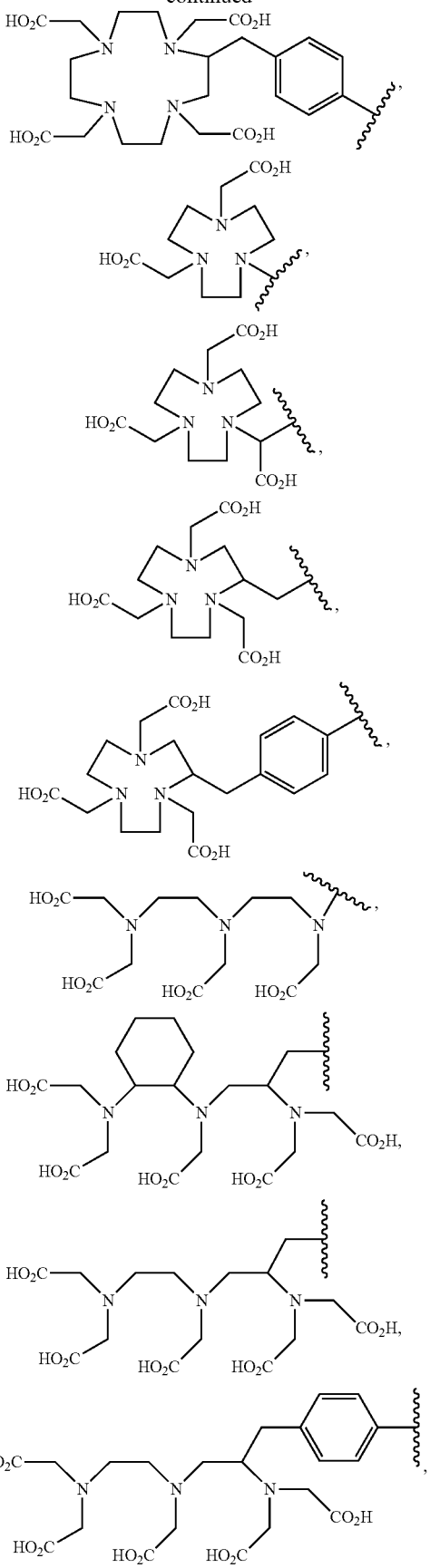

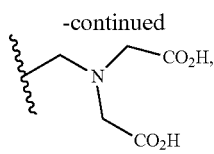

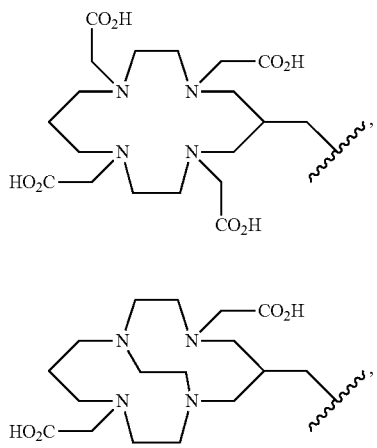

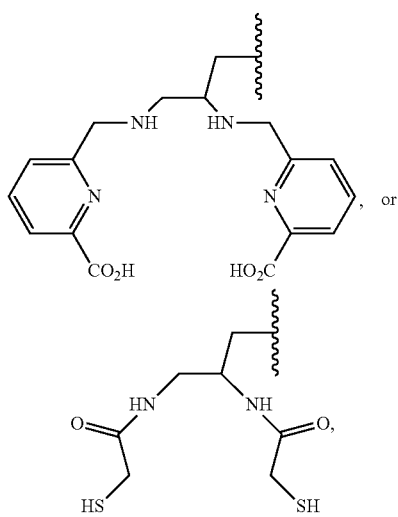

L is a direct bond, —(CH$_2$)n-NHCO—(CH$_2$)m-, or —((CH$_2$)$_2$O)x-(CH$_2$)n-NHCO—(CH$_2$)m-, and n, m, and x are each independently an integer in a range of from 0 to 3.

2. The compound or the pharmaceutically acceptable salt thereof of claim 1, wherein R$_1$ is a chelating agent labeled with a metallic radioisotope.

3. The compound or the pharmaceutically acceptable salt thereof of claim 2, wherein the metallic radioisotope is Ga-66, Ga-68, Cu-61, Cu-62, Cu-64, Cu-67, Pb-212, Bi-212, Pd-109, Y-86, Co-55, Zr-89, Sr-83, Mn-52, As-72, Sc-44, Ga-67, In-111, or Tc-99m.

4. The compound or the pharmaceutically acceptable salt thereof of claim 1, wherein the compound of formula (1) is:

2,2',2''-(10-(2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)-1,4,7,10-tetraazacyclododecane-1,4,7-triyl)triacetic acid;

2,2'-(7-(1-carboxy-4-((2-((5-((S)-2-carboxy-1-((R)-1-(3-(piperidin-4-yl)propanoyl)piperidine-3-carboxamido)ethyl)pyridin-3-yl)oxy)ethyl)amino)-4-oxobutyl)-1,4,7-triazonane-1,4-diyl)diacetic acid;

(S)-3-(5-(2-(2-DTPA acetamido)ethoxy)pyridin-3-yl)-3-((R)-1-(3-(piperidin-4-yl)propanoyl)piperidine-3-carboxamido) propanoic acid; or 2,2'-((2-((2-((5-((S)-2-carboxy-1-((R)-1-(3-(piperidin-4-yl)propanoyl)piperidine-3-carboxamido)ethyl)pyridin-3-yl)oxy)ethyl)amino)-2-oxoethyl)azanediyl)diacetic acid.

5. A thrombus imaging composition, comprising:
the compound or the pharmaceutically acceptable salt thereof of claim 1 labeled with a metallic radioisotope as an active ingredient.

6. The thrombus imaging composition of claim 5, wherein the metallic radioisotope is Ga-66, Ga-68, Cu-61, Cu-62, Cu-64, Cu-67, Pb-212, Bi-212, Pd-109, Y-86, Co-55, Zr-89, Sr-83, Mn-52, As-72, Sc-44, Ga-67, In-111, or Tc-99m.

7. The thrombus imaging composition of claim 5, wherein the compound or the pharmaceutically acceptable salt thereof labeled with the metallic radioisotope is:

(2)

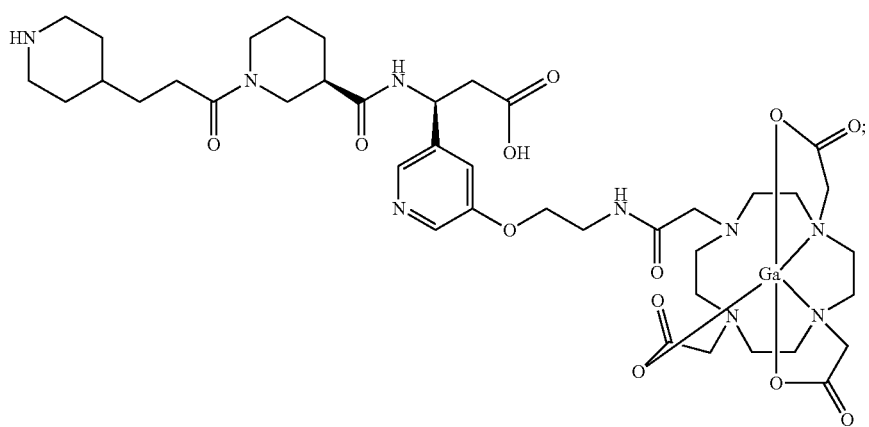

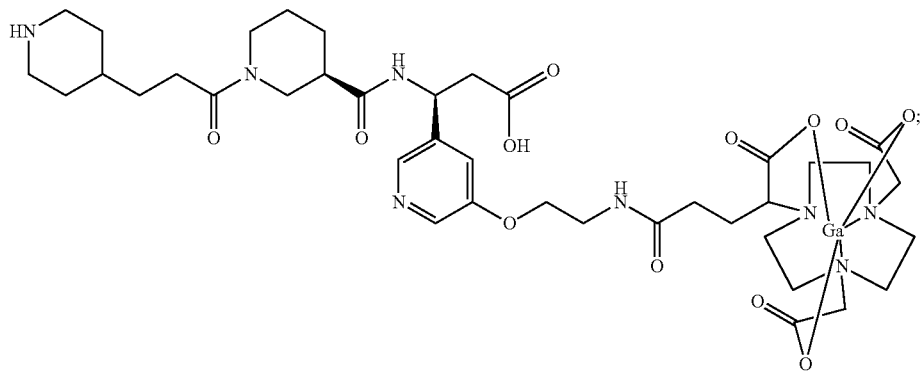

(3)

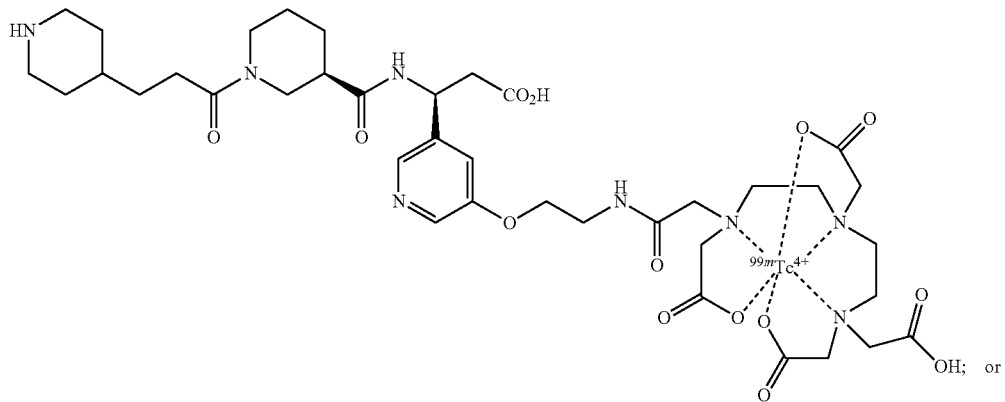

(4)

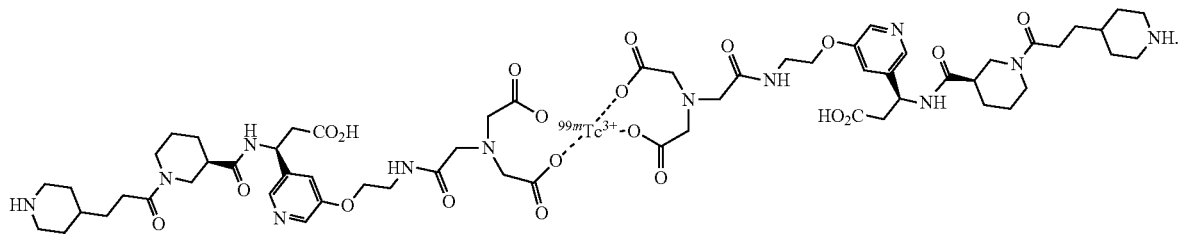

(5)

8. The thrombus imaging composition of claim 5, further comprising:
cysteine, vitamin B1, and/or vitamin B6.

9. A kit suitable for preparing a metallic radioisotope-labeled radiopharmaceutical, the kit comprising:
the compound or the pharmaceutically acceptable salt thereof of claim 1 as an active ingredient.

10. The kit of claim 9, further comprising:
a metallic radioisotope.

11. The kit of claim 10, wherein the metallic radioisotope is Ga-66, Ga-68, Cu-61, Cu-62, Cu-64, Cu-67, Pb-212, Bi-212, Pd-109, Y-86, Co-55, Zr-89, Sr-83, Mn-52, As-72, Sc-44, Ga-67, In-111, or Tc-99m.

12. The kit of claim 9, wherein the compound or the pharmaceutically acceptable salt thereof is in a solution state, a refrigerated state, a frozen state, or a lyophilized state.

13. The kit of claim 9, further comprising:
cysteine, vitamin B1, and/or vitamin B6.

14. The kit of claim 9, further comprising:
an HEPES buffer, an acetate buffer, ethanol, and/or water for injection.

15. A pharmaceutical composition suitable for diagnosing a thrombotic disease, the pharmaceutical composition comprising:
the thrombus imaging composition of claim 5 as an active ingredient.

16. A thrombus imaging method, the method comprising:
administering an effective amount of the compound of claim 1 labeled with a metallic radioisotope to a subject in need thereof.

17. A method for providing information for diagnosing a thrombotic disease, the method comprising:
administering the thrombus imaging composition of claim 5 to a subject in need thereof.

18. A method for diagnosing a thrombotic disease, the method comprising:
administering the thrombus imaging composition of claim 5 to a subject in need thereof.

19. The compound or the pharmaceutically acceptable salt thereof of claim 1, wherein L is —(CH$_2$)n-NHCO—(CH$_2$)m-.

20. The compound or the pharmaceutically acceptable salt thereof of claim 1, wherein L is —$(CH_2)_n$-NHCO—$(CH_2)_m$-, and n is 2 and m is 1.

* * * * *